US007716255B2

(12) United States Patent
Stuhec

(10) Patent No.: US 7,716,255 B2
(45) Date of Patent: May 11, 2010

(54) MODELING A DATA ELEMENT

(75) Inventor: Gunther Stuhec, Heidelberg (DE)

(73) Assignee: SAP AG, Walldorf ( * ) Notice: Subject to any disclaimer, the term of this patent is extended or adjusted under 35 U.S.C. 154(b) by 265 days.

(21) Appl. No.: 11/291,327

(22) Filed: Nov. 30, 2005

(65) Prior Publication Data

US 2007/0124320 A1 May 31, 2007

(51) Int. Cl.
*G06F 7/00* (2006.01)
*G06F 12/00* (2006.01)

(52) U.S. Cl. ........................ 707/803; 707/805; 707/810

(58) Field of Classification Search ................. 707/100, 707/101

See application file for complete search history.

(56) References Cited

U.S. PATENT DOCUMENTS

| | | | | |
|---|---|---|---|---|
| 5,444,841 | A * | 8/1995 | Glaser et al. | 715/224 |
| 6,560,608 | B1 | 5/2003 | Tomm et al. | |
| 6,662,237 | B1 | 12/2003 | Leckie | |
| 6,694,338 | B1 | 2/2004 | Lindsay | |
| 6,757,739 | B1 | 6/2004 | Tomm et al. | |
| 7,155,665 | B1 * | 12/2006 | Browne et al. | 715/503 |
| 7,194,695 | B1 * | 3/2007 | Racine et al. | 707/104.1 |
| 2002/0116389 | A1 * | 8/2002 | Chen et al. | 707/103 R |
| 2002/0116413 | A1 * | 8/2002 | Clark | 707/513 |
| 2002/0120506 | A1 * | 8/2002 | Hagen | 705/14 |
| 2005/0198074 | A1 * | 9/2005 | Khayter et al. | 707/104.1 |

OTHER PUBLICATIONS

Information technology—Specification and standardization of data elements Part 5, "Naming and identifyng principles for data elements" ISO/IEC 11179-5 pp. i-iv & 1-14.*

"Adobe LiveCycle Designer FAQ" *Adobe Systems Incorporated*, document undated, 3 pages.

"Core Components Technical Specification V2.01—Part 8 of the ebXML Framework" for UN/CEFACT, Nov. 15, 2003, pp. 1-113.

XForms 1.1, W3C Working Draft Nov. 15, 2004, Obtained from the Internet at http://www.w3.org/TR/2004/WD-xforms11-20041115, on Dec. 6, 2004, 26 pages.

XML Schema, W3C, Obtained from the Internet http://www.w3.org/XML/Schema on Jan. 3, 2005, 16 pages.

XForms—The Next Generation of Web Forms, W3C, obtained from the Internet at http://www.w3.org/MarkUp/Forms, on Jan. 3, 2005, 11 pages.

(Continued)

*Primary Examiner*—Vincent Boccio
(74) *Attorney, Agent, or Firm*—Fish & Richardson P.C.

(57) ABSTRACT

A computer system includes a repository with predefined data elements for use in identifying information portions in electronic communications. Each data element is associated with semantic information indicating its definition and intended use. The system includes a modeling tool that, upon selection by a user, displays any of the predefined data elements and the semantic information for editing. A method includes receiving a first user input made under guidance of the modeling tool in a graphical user interface (GUI). The input selects one of several predefined data elements that are associated with semantic information indicating their definition and intended use. In response to the first user input, a representation of the selected predefined data element containing the semantic information is presented in the GUI. At least one aspect of the semantic information is modified based on a second user input made under guidance of the modeling tool.

21 Claims, 23 Drawing Sheets

OTHER PUBLICATIONS

XML Path Language (XPath) Version 1.0—W3C Recommendation Nov. 16, 1999, W3C, Obtained from the Internet at http://www.w3.org/TR/xpath, on Jan. 3, 2005, 37 pages.
InfoPath 2003 Product Overview, Microsoft Office Online, Obtained from the Internet at http://www.microsoft.com/office/infopath/prodinfo/overview.mspx, on Jan. 4, 2005.
Davis, J., *Context Tailor: Towards a Programming Model for Context-Aware Computing*, International Middleware Conference Workshop Proceedings—Middleware for Pervasive and Ad Hoc Computing, Jun. 16-20, 2003, Rio de Janeiro, Brazil, 68-75, 2003.
Oasis ebXML Registry TC[online], Oasis, 2005 [retrieved on Mar. 23, 2005]. Retrieved from the Internet: <URL: http://www.oasis-open.org/committees/tc_home.php?wg_abbrev=regrep>.
GoXML Registry [online], Xenos, 2002 [retrieved on Mar. 23, 2005]. Retrieved from the Internet: <URL: http://www.xmlglobal.com/solutions/prod_goxml_registry.asp>.
The Company of The Open Standard Solutions [online], ebXMLsoft Inc., 2001-2004 [retrieved on Mar. 23, 2005]. Retrieved from the Internet: <URL: http://www.ebsmlsoft.com/ >.
Project: ebXML Registry/Repository: Summary [online], SourceForge.net, 2005 [retrieved on Mar. 23, 2005]. Retrieved from the Internet: <URL: http://sourceforge.net/projects/ebsmlrr >.
AnHai Doan, Jayant Madhaven, Pedro Domingos, and Alon Halevy, "Learning to Map between Ontologies on the Semantic Web," May 2002, *Proceedings of the 11th International World Wide Web Conference*, pp. 662-673.
L. M. Haas, R. J. Miller, B. Niswonger, M. Tork Roth, P. M. Schwarz, and E. L. Wimmers, "Transforming Heterogeneous Data with Database Middleware: Beyond Integration," Copyright 1997, *Computer Society Technical Committee on Data Engineering*, pp. 1-6.
Hong-Hai Do and Erhard Rahm, "COMA—A system for flexible combination of schema matching approaches," Aug. 2002, *Proc. 28th Intl. Conference on Very Large Databases* (*VLDB*), Hongkong, pp. 1-12.
Hong-Hai Do, Sergey Melnik, and Erhard Rahm, "Comparison of Schema Matching Evaluations," Oct. 2002, *Proc. GI-Workshop* "Web and Databases", Erfurt, pp. 1-15.
Jayant Madhavan, Philip A. Bernstein, and Erhard Rahm, "Generic Schema Matching with Cupid," 2001, *Proceedings of the 27th VLDB Conference*, pp. 49-58.
Jayant Madhaven, Philip A. Bernstein, and Erhard Rahm, "Generic Schema Matching with Cupid," Aug. 2001, *Microsoft Research*, MSR-TR-2001-58, pp. 1-15.
Sergey Melnik, Hector Garcia-Molina, and Erhard Rahm, "Similarity Flooding: A Versatile Graph Matching Algorithm and its Application to Schema Matching," 2002, *Proc. 18th Int'l Conf. on Data Engineering* (*ICDE*), pp. 1-12.
Lucian Popa, Yannis Velegrakis, Renee J. Miller, Mauricio A. Hernandez, Ronald Fagin, "Translating Web Data," 2002, *The Eleventh International WWW Conference*, pp. 1-12.
Hong Su, Harumi, Kuno, and Elke A. Rundensteiner, "Automating the Transformation of XML Documents," 2001, *The ACM Digital Library*, pp. 68-75.
http://www.flexisoftsolutions.com/Products/SM2004/SM2004.aspx—*FlexiSoft Solutions*, obtained from the Internet on Jun. 24, 2005, 4 pages.
http://ww.notes.queensu.ca/uisadmin.nsf/579a5e3cc0e046c085256833007715cc/$FILE/queries_guide.pdf—BI/Query Queries Guide, *Hummingbird, Ltd*., obtained from the Internet on Jul. 18, 2005, 6 pages.
"Final Committee Draft ISO/IEC FCD—Information technology—Metadata registries (MDR)—Part 5: Naming and identification principles" *ISO/IEC*, document dated Jan. 8, 2004, 26 pages.
Goyal, "An XML Schema Naming Assister for Elements and Types," *National Institute of Standards and Technology*, documented obtained at http://www.mel.nist.gov/msidlibrary/doc/NISTIR7143.pdf on Jun. 24, 2005, 12 pages.
"Information technology—Metadata registries (MDR)—Part 4: Formulation of data definitions," *ISO/IEC*, document dated Jul. 15, 2004, 16 pages.
"Information technology—Specification and standardization of data elements—Part 5: Naming and identification principles for data elements," *ISO/IEC*, document dated Dec. 1, 1995, 20 pages.
GEFEG EDIFIX, "EDIFIX Functions," [online], Xenos, 2002 [retrieved on Nov. 30, 2005]. <URL: http://www.gefeg.com/en/edifix/fx_functions.htm>.
"Information technology—Metadata Registries (MDR)—Part 1: Framework" International Standard ISO/IEC 11179-1; Sep. 15, 2004; (32 pages).
"Information technology—Metadata Registries (MDR)—Part 2: Classification"; International Standard ISO/IEC 11179-2; Nov. 15, 2005 (16 pages).
"Information Technology—Metadata Registries (MDR)—Part 3: Registry Metamodel and Basic Attributes"; International Standard ISO/IEC 11179-3; Feb. 15, 2003 (108 pages).
"Information Technology—Metadata Registries (MDR)—Part 4: Formulation of Data Definitions" International Standard ISO/IEC 11179-04; Jul. 15, 2004 (16 pages).
"Information Technology—Metadata Registries (MDR)—Part 5: Naming and Identification Principles"; International Standard ISO/IEC 11179-5; Sep. 1, 2005.
"Information Technology—Metadata Registries (MDR)—Part 6: Registration". International Standard ISO/IEC 111790-6; Jan. 15, 2005.
ebXML Business Process Specification Schema Version 1.01 [online]. Oasis 2001, [retrieved on Mar. 21, 2006]. Retrieved from the Internet: <URL: http://www.ebxml.org/specs/ebBPSS.pdf>.

* cited by examiner

| | | | | | | DEN | GDT | XSD | ABAP | Java | Layout | | |
|---|---|---|---|---|---|---|---|---|---|---|---|---|---|
| | | | | ⊙ | | | | <<ABIE>> | | | | | ■⊙ |
| | Context | | | | ⊛ | | | Delivery Terms. | | Details ⟵716 | | | |
| SYS | IN | BP | BR | CO | | Type | OCQ | OCT | | PQ | PT | RT | Oc. |
| | | | | | ⊛ | <<BBIE>> | | Delivery Terms. | Delivery Item_ | Group. | Identifier | | [1..1] |
| A,B.. | | O,I | B,S.. | | ⊛ | <<BBIE>> | | Delivery Terms. | Delivery_ | Priority. | Code | | [0..1] |
| | | | | | ⊛ | <<ASBIE>> | | Delivery Terms. | | Incoterms. | Incoterms | | [0..1] |
| | A,C.. | | | U,G.. | ⊛ | <<ASBIE>> | | Delivery Terms. | | Partial. | Delivery | | [0..n] |
| A | C | O | S | G | ⊛ | <<ASBIE>> | | Delivery Terms. | Delivery Item_ | Quantity. | Tolerance | | [0..1] |
| | | | | | ⊛ | <<BBIE>> | | Delivery Terms. | Maximum Lead_ | Time. | Duration | | [0..1] |
| | C,D.. | | S,M.. | G,A.. | ⊛ | <<ASBIE>> | | Delivery Terms. | | Transport. | Transport | | [0..1] |
| | | | | | ⊛ | <<BBIE>> | | Delivery Terms. | | Description. | Text | | [0..1] |
| A | C | O | S | G | ⊛ | <<BBIE>> | | Delivery Terms. | <?> 718 | Base | ▼ unt | | [0..1] |

722 {
Deductible
Expected
Lower
NonDeductible
Tax
Upper
...
<new>
} 720

704

230

232

204

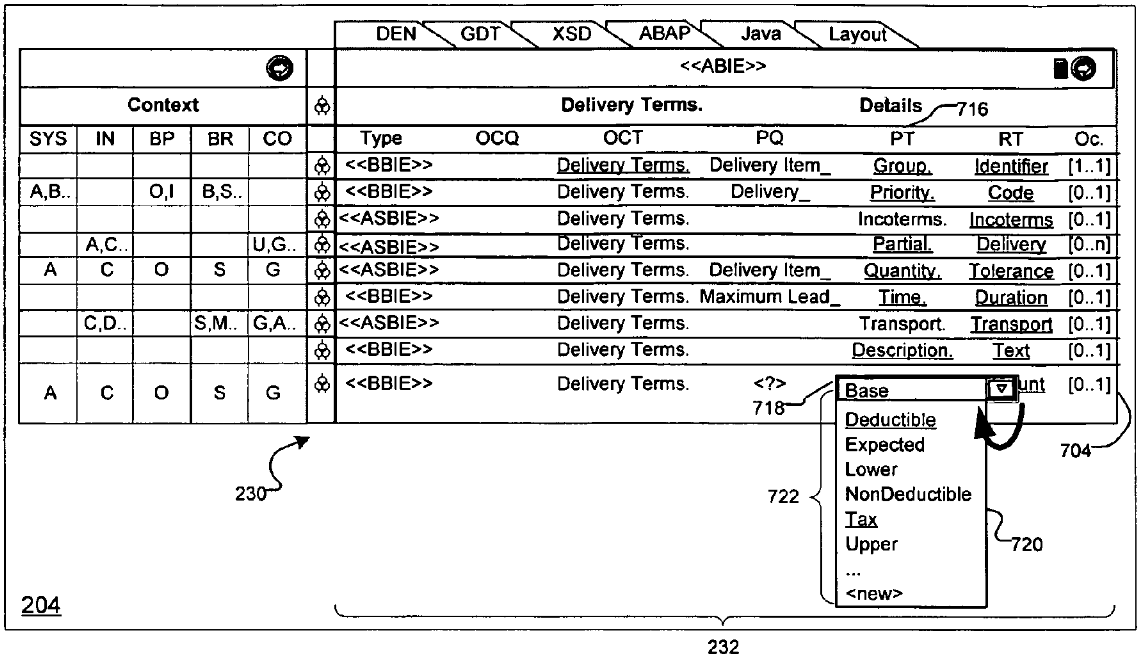

FIG. 7D

| | | | | | | DEN | GDT | XSD | ABAP | Java | Layout | | |
|---|---|---|---|---|---|---|---|---|---|---|---|---|---|
| | | | | ⊙ | | | | <<ABIE>> | | | | | ■⊙ |
| | Context | | | | ⊛ | | | Delivery Terms. ⟵724 | | Details ⟵716 | | | |
| SYS | IN | BP | BR | CO | | Type | OCQ | OCT | | PQ | PT | RT | Oc. |
| | | | | | ⊛ | <<BBIE>> | | Delivery Terms. | Delivery Item_ | Group. | Identifier | | [1..1] |
| A,B.. | | O,I | B,S.. | | ⊛ | <<BBIE>> | | Delivery Terms. | Delivery_ | Priority. | Code | | [0..1] |
| | | | | | ⊛ | <<ASBIE>> | | Delivery Terms. | | Incoterms. | Incoterms | | [0..1] |
| | A,C.. | | | U,G.. | ⊛ | <<ASBIE>> | | Delivery Terms. | | Partial. | Delivery | | [0..n] |
| A | C | O | S | G | ⊛ | <<ASBIE>> | | Delivery Terms. | Delivery Item_ | Quantity. | Tolerance | | [0..1] |
| | | | | | ⊛ | <<BBIE>> | | Delivery Terms. | Maximum Lead_ | Time. | Duration | | [0..1] |
| | C,D.. | | S,M.. | G,A.. | ⊛ | <<ASBIE>> | | Delivery Terms. | | Transport. | Transport | | [0..1] |
| | | | | | ⊛ | <<BBIE>> | | Delivery Terms. | | Description. | Text | | [0..1] |
| A | C | O | S | G | ⊛ | <<BBIE>> | | Delivery Terms. 726 | Base | ▼ Tax. | Amount | | [0..1] |

730 {
Goods
Insurance
<?> Sales
Services
Total
Value Added
...
<new>
}

704

230

232

204

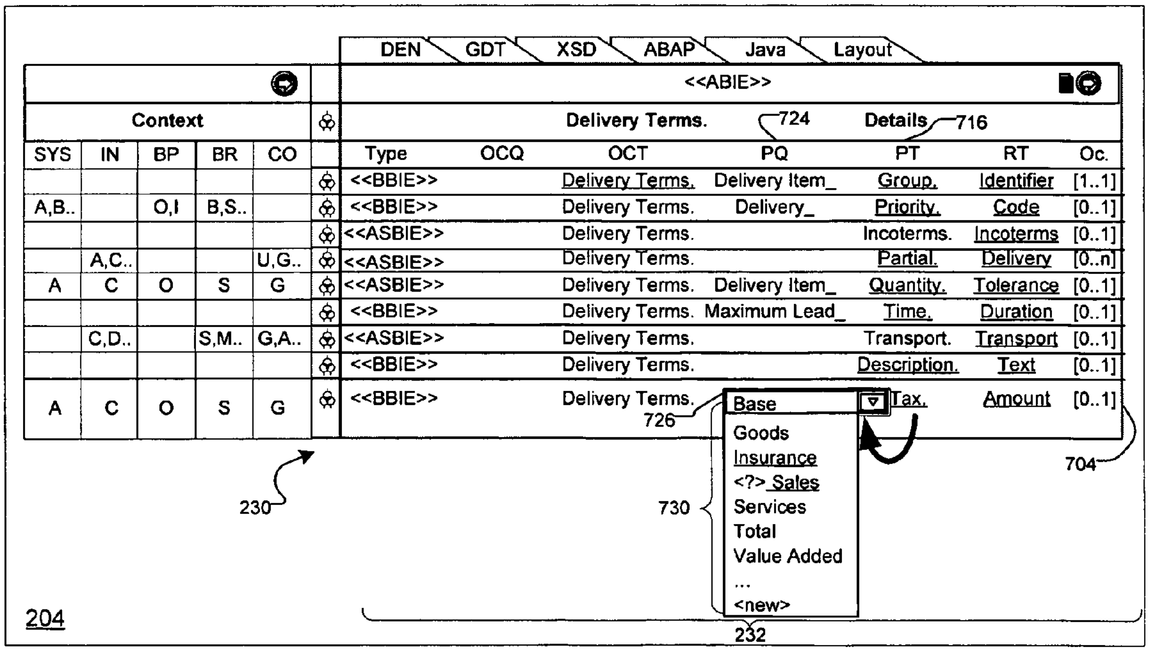

FIG. 7E

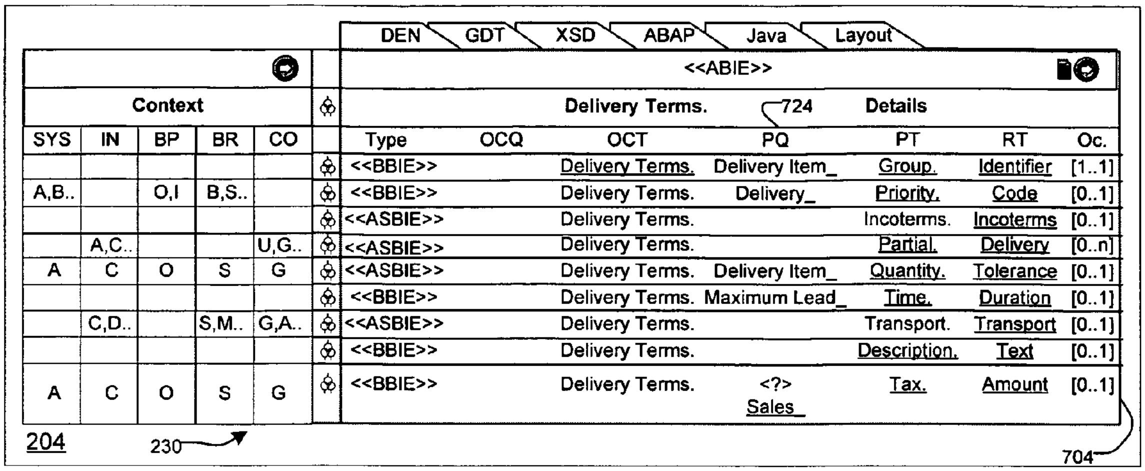

FIG. 7F

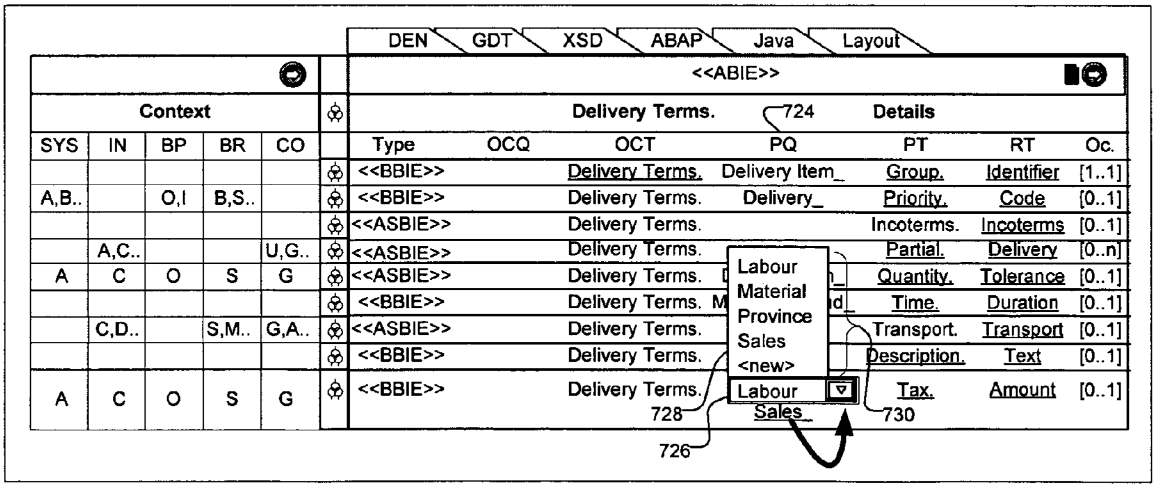

FIG. 7G

| | | | | | | DEN | GDT | XSD | ABAP | Java | Layout | | |
|---|---|---|---|---|---|---|---|---|---|---|---|---|---|
| | | | | ◉ | | | | <<ABIE>> | | | | | |
| | Context | | | | � | | Delivery Terms. ⌐724 | | Details | | | | |
| SYS | IN | BP | BR | CO | | Type | OCQ | OCT | PQ | PT | RT | Oc. | |
| | | | | | � | <<BBIE>> | | Delivery Terms. | Delivery Item_ | Group. | Identifier | [1..1] | |
| A,B.. | | O,I | B,S.. | | � | <<BBIE>> | | Delivery Terms. | Delivery_ | Priority. | Code | [0..1] | |
| | | | | | � | <<ASBIE>> | | Delivery Terms. | | Incoterms. | Incoterms | [0..1] | |
| | A,C.. | | | U,G.. | � | <<ASBIE>> | | Delivery Terms. | | Partial. | Delivery | [0..n] | |
| A | C | O | S | G | � | <<ASBIE>> | | Delivery Terms. | Delivery Item_ | Quantity. | Tolerance | [0..1] | |
| | | | | | � | <<BBIE>> | | Delivery Terms. | Maximum Lead_ | Time. | Duration | [0..1] | |
| | C,D.. | | S,M.. | G,A.. | � | <<ASBIE>> | | Delivery Terms. | | Transport. | Transport | [0..1] | |
| | | | | | � | <<BBIE>> | | Delivery Terms. | | Description. | Text | [0..1] | |
| A | C | O | S | G | � | <<BBIE>> | | Delivery Terms. | <?> Sales_ | Tax. | Amount | [0..1] | |
| 204 | | 230 | | | | | | | | | | 704 | |

| | | | | | | DEN | GDT | XSD | ABAP | Java | Layout | | |
|---|---|---|---|---|---|---|---|---|---|---|---|---|---|
| | | | | ◉ | | | | <<ABIE>> | | | | | |
| | Context | | | | � | | Delivery Terms. ⌐724 | | Details | | | | |
| SYS | IN | BP | BR | CO | | Type | OCQ | OCT | PQ | PT | RT | Oc. | |
| | | | | | � | <<BBIE>> | | Delivery Terms. | Delivery Item_ | Group. | Identifier | [1..1] | |
| A,B.. | | O,I | B,S.. | | � | <<BBIE>> | | Delivery Terms. | Delivery_ | Priority. | Code | [0..1] | |
| | | | | | � | <<ASBIE>> | | Delivery Terms. | | Incoterms. | Incoterms | [0..1] | |
| | A,C.. | | | U,G.. | � | <<ASBIE>> | | Delivery Terms. | | Partial. | Delivery | [0..n] | |
| A | C | O | S | G | � | <<ASBIE>> | | Delivery Terms. | Labour Material Province Sales <new> | Quantity. | Tolerance | [0..1] | |
| | | | | | � | <<BBIE>> | | Delivery Terms. M | | Time. | Duration | [0..1] | |
| | C,D.. | | S,M.. | G,A.. | � | <<ASBIE>> | | Delivery Terms. | | Transport. | Transport | [0..1] | |
| | | | | | � | <<BBIE>> | | Delivery Terms. | | Description. | Text | [0..1] | |
| A | C | O | S | G | � | <<BBIE>> | | Delivery Terms. 728 | Labour Sales_ | Tax. 730 | Amount | [0..1] | |
| | | | | | | | | | 726 | | | | |

1300

<<ABIE>>

Postal Address. Details

| Type | OCQ | OCT | PQ | PT | RT | Occ. |
|---|---|---|---|---|---|---|
| <<BBIE>> | | Postal Address. | | Street. | Name | [0..1] |
| <<BBIE>> | | Postal Address. | | House Number. | Text | [0..1] |
| <<BBIE>> | | Postal Address. | | City. | Name | [0..1] |
| <<BBIE>> | | Postal Address. | | Postal Code. | Identifier | [1..1] |
| <<BBIE>> | | Postal Address. | | Country. | Code | [1..1] |

1314

1316

<<QDT>>

Country_ Code. Type

| Type | OCQ | OCT | PT | RT | Occ. | Base Type | Restriction |
|---|---|---|---|---|---|---|---|
| <<CC>> | Country_ | Code. | | Content | 1..1 | xsd:token | |
| <<SC>> | Country_ | Code List. | Identification. | Identifier | 0..1 | xsd:normalizedString | length 1..60 pattern |
| <<SC>> | Country_ | Code List. | Version. | Identifier | 0..1 | xsd:normalizedString | length 1..15 pattern |
| <<SC>> | Country_ | Code List. | Agency. | Identifier | 0..1 | xsd:normalizedString | length 1..60 pattern |
| <<SC>> | Country_ | Code List. | Agency Scheme. | Identifier | 0..1 | xsd:normalizedString | length 1..60 pattern |
| <<SC>> | Country_ | Code List. | Agency Scheme Agency. | Identifier | 0..1 | xsd:normalizedString | length 1..60 pattern |
| <<SC>> | Country_ | Code. | Language. | Code | 0..1 | xsd:language | RFC 3006:2001:IETF |

- OR -

1318

<<QDT>>

Country_ Code. Type

| Type | OCT | OCT | PT | RT | Occ. | Base Type | Restriction |
|---|---|---|---|---|---|---|---|
| <<CC>> | Country_ | Code. | | Content | 1..1 | xsd:token | |
| <<SC>> | Country_ | Code List. | Agency Uniform Resource. | Identifier | 0..1 | xsd:anyURI | <CodeListID>:<VersionID>:<AgencyID> |

FIG. 13B

MODELING A DATA ELEMENT

TECHNICAL FIELD

The description relates to modeling a data element that can be used in an electronic communication.

BACKGROUND

Electronic communication can be streamlined using data elements to identify specific information portions in the electronic message. The elements are to be used as components of the electronic communication in that they are individually associated with the different categories of information included therein. Using a commonly accepted form of such elements, such as a form adopted by standard or agreed upon between business partners, eliminates some problems or inconsistencies that may otherwise occur. For example, the standard UN/CEFACT Core Components Technical Specification (CCTS) defines Core Components as context-independent data elements to be used as building blocks in such an endeavor. Similarly, the CCTS defines Business Information Entities as context-specific elements.

The CCTS also defines the concept of Dictionary Entry Names (DENs) to be used for Core Components, Business Information Entities, or the data types upon which either of these elements is based. The DENs are based on a natural language—primarily English—such that humans and machines can understand the meaning and logic thereof. The DENs are examples of the semantic information that specify the definition and intended use of data elements.

Existing modeling tools are not configured for use in modeling data elements that can identify information, such that they will be collaboratively and unambiguously understood. Particularly, existing tools do not focus on semantic information associated with the data elements in a way that aids the user in the modeling process. In the modeling of data elements modeled using existing technology there may therefore be inefficiencies, difficulties in overviewing the scope of the modeling process, and a lack of detail and clarity.

SUMMARY

The invention relates to modeling a data element.

In a first general aspect, a computer system includes a repository having stored therein predefined data elements for use in identifying information portions in electronic communications. Each of the predefined data elements is associated with semantic information indicating its definition and intended use. The computer system further includes a modeling tool that, upon selection by a user, displays any of the predefined data elements for editing. The modeling tool presents the semantic information for the selected data element.

Implementations may include any or all of the following features. The modeling tool may present a user-selectable control for adding a new data element to the selected data element, and the user-selectable control may provide a choice between creating the new data element as a new aggregation data element and a new basic data element. The modeling tool may provide that the user can select between predefined data types for the new data element. Upon the user selecting one of the predefined data types, the modeling tool may provide that the user can select between predefined properties associated with the selected predefined data type. The modeling tool may determine at least one of the predefined properties that, together with the selected predefined data type, is of a qualified data type, and highlight the at least one of the predefined properties. Upon the user selecting one of the predefined properties, the modeling tool may provide that the user can select between predefined qualifiers associated with the selected predefined property. The modeling tool may determine at least one of the predefined qualifiers that, together with the selected predefined property and the selected predefined data type, is of a qualified data type, and highlight the at least one of the predefined qualifiers. The modeling tool may be configured to present more than one physical representation of the selected data element. The modeling tool may provide that the user can modify, for any data element included in the selected data element, a value for any of several context categories that affect the relevance of the data element. The modeling tool may be configured to present an item from at least one standard for electronic communication, the item being associated with a data element included in the selected data element through a mapping. The semantic information may include at least a data type, a property and a qualifier for the property. The modeling tool may provide a choice control for indicating a possible choice between several data elements included in the selected data element. The modeling tool may provide a sequence control for indicating a sequence including several data elements included in the selected data element. The modeling tool may provide a choice control and a sequence control, and the user may nest one of the choice control and the sequence control within the other.

In a second general aspect, a method to be performed in a process of a user modeling a data element includes receiving a first user input made under guidance of a modeling tool in a graphical user interface (GUI). The input selects one of several predefined data elements that are associated with semantic information indicating their definition and intended use. The method includes presenting, in the GUI and in response to the first user input, a representation of the selected predefined data element. The representation contains the semantic information. The method includes modifying at least one aspect of the semantic information based on a second user input made under guidance of the modeling tool.

In implementations, the modification may include adding another data element to a group of data elements that make up the selected data element.

In a third general aspect, a computer-program product tangibly embodied in an information carrier includes instructions that, when executed by a processor, generate on a display device a graphical user interface (GUI) for modeling a data component. The GUI includes a data component modeling area that presents a predefined data component selected by a user for editing. The data component modeling area presents semantic information for the selected data component. The GUI further includes a data type modeling area that, upon the user's selection, presents a data type on which the selected data component is based.

Implementations may include any or all of the following features. The data component modeling area may further present, upon selection by the user, at least one data component that is included in the selected data component. The data component modeling area may visually indicate a modification that is made in the semantic information based on user input. The data type modeling area may further present data type semantic information editable by the user.

Advantages of the systems and techniques described herein may include any or all of the following: Providing a modeling tool that considers common semantic representation of object classes, attributes and associations. Providing a modeling tool that reduces and counteracts inconsistent naming of artifacts. Providing a modeling tool that preserves component integrity at a semantic level. Providing a modeling tool that visualizes all relevant information of a data component on a central stage, wherein every component can have additional information about concepts such as the semantic, technical representation, documentation, mapping of other standards, statistics and layout representation.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 7A-I show examples of modeling using a data component shown in FIG. 2.

FIG. 13A-B show examples of core data types on which another data component is based being represented using additional attributes or a designated namespace.

Like reference numerals in the various drawings indicate like elements.

DETAILED DESCRIPTION

Figure 1:
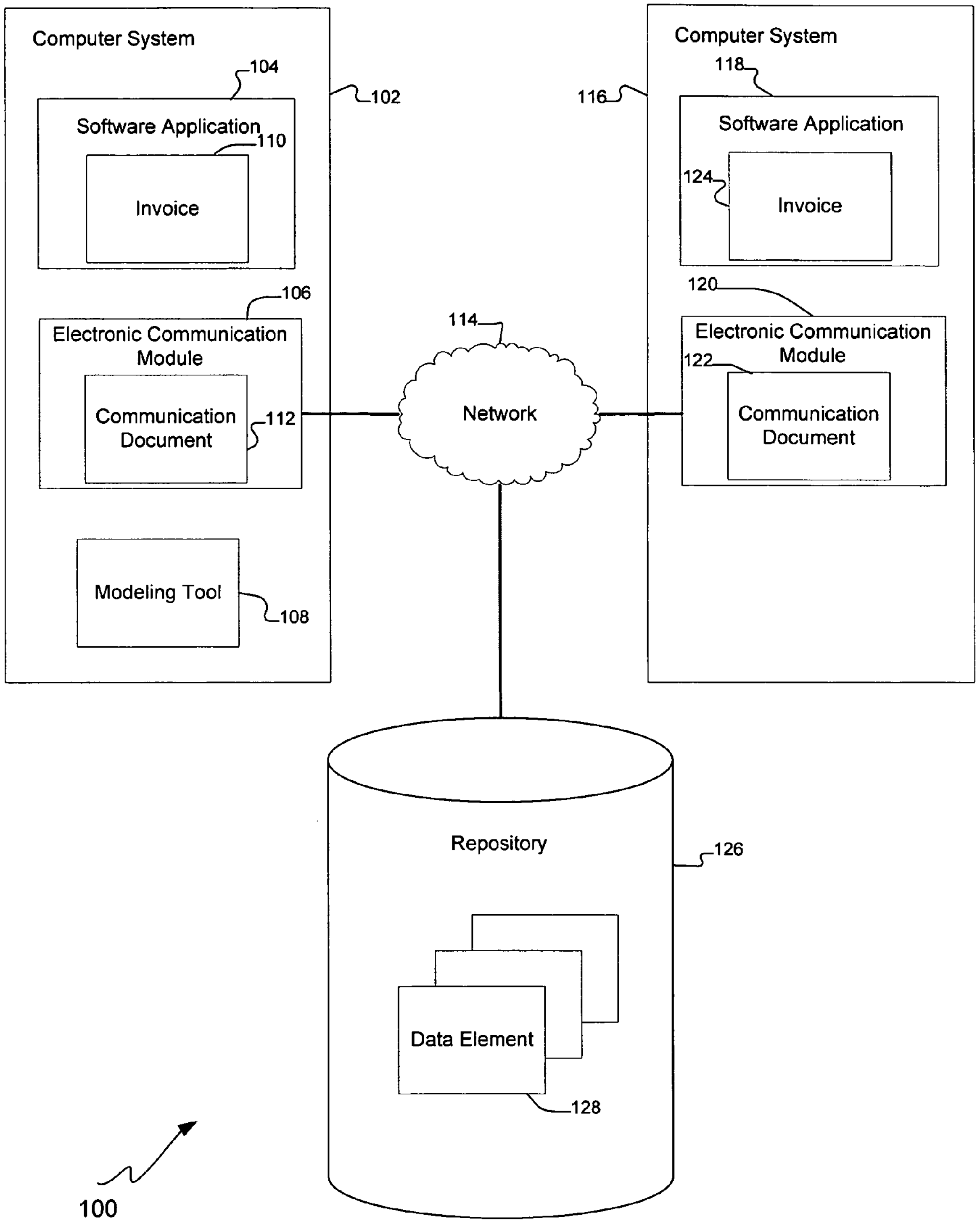
FIG. 1 shows an example of a system that can model and use data components.

FIG. 1 shows an exemplary system 100 for modeling and using data elements. A data element can be included as a component of an electronic communication, such as in a formatted electronic document, to identify a specific information category or information portion therein. Each data element may be associated with a semantic meaning and a unique name related to the semantic meaning of the data element. Particularly, the exemplary system 100 includes a modeling tool for creating or modifying any of the data elements.

The system 100 includes a computer system 102. In the exemplary system 100, the computer system 102 includes a software application 104, an electronic communication module 106, and a modeling tool 108. The software application 104 may be a software editor that presents electronic documents. In this example, the software application 104 is capable of preparing and displaying electronic business information, such as an electronic invoice 110, an electronic order, or an address book with business contact information. The software application 104 creates electronic documents using information available in the computer system 102 and following a specific format. The computer system 102 can prepare an electronic document and can store it as a communication document 112 for electronic communication.

The computer system 102 may communicate with other computer systems using the electronic communication module 106 through a network 114. Through the network 114 the computer system 102 may communicate with another computer system 116. The computer system 116 further includes a software application 118 that is capable of displaying formatted electronic documents, and an electronic communication module 120 for engaging in communication over the network 114.

The electronic communication module 120 currently contains a communication document 122, which the electronic communication module 120 can exchange over the network 114. In one embodiment, the electronic communication module may be a Local Area Network (LAN) interface and the network 114 may be the internet. For example, the communication document 122 may be a document that the computer system 116 receives from the computer system 102, or it may be a document that the computer system 116 generates for sending to the computer system 102. Different software applications may use different formats to construct electronic documents. For example, in electronic business communication, there are a wide variety of formats such as EDIFACT, X12, CIDX, PIDX, RosettaNet, a CCTS-based schema, or SAP IDoc. In the exemplary system 100, the software application 118 may be configured to display an invoice 124 to a user based on the communication document 122.

The communication document 112 and the communication document 122 use data elements to identify information portions. The receiving software application 104 and the software application 116 can therefore format them in any format because the semantics of the data elements are accessible in a repository. The communication can be bidirectional, i.e. the computer system 102 may send or receive communication documents from the computer system 116. For brevity, suppose the computer system 116 is to receive a communication document from the computer system 102. In this example, the software application 104 first creates the communication document 112 using data elements. The data elements identify specific portions of information in the content of the communication document 112. Upon receiving the communication document 112, the computer system 116 may interpret the content of the communication document 112 using the data elements in the document 112. For example, the computer system 116 can access a repository that stores definitions of the data elements to interpret them. The repository may be publicly accessible or it may require controlled access.

The exemplary system 100 includes an example of a repository 126, which is accessible by the computer systems 102 and 116. The repository 126 stores a list of data element entries 128. Each data element entry 128 could include the definitions and the names of data elements, or it could be a list of data elements associated with names and definitions stored elsewhere. The data element entries 128 can be used to identify a specific type or category of information in an electronic communication, such as an address or an invoice amount. The data element entries 128 can be generated or modified using the modeling tool 108.

The following example illustrates a process of using data elements stored in the repository. In the exemplary system 100, suppose the owner of the computer system 102 and the owner of the computer system 116 wish to engage in business transactions. The transactions are to be completed, in part, through electronic communication by transmitting an invoice from the seller to the buyer. The individual portions of invoice information should be identified using data elements defined in the repository 126. The seller, here system 102, creates the invoice template using appropriate data elements from the repository and announces to the buyer, here system 116, that data elements from the publicly accessible repository 126 will be used in the transaction. The system 102 then creates the invoice using the template and transmits the created invoice over the network. The computer system 116 receives the transmitted invoice in form of the communication document 122. At an earlier time, or upon receiving the communication document 122, the buyer configures the system 116 to recognize the data elements used in the invoice. For example, the system 116 retrieves all available data elements from the repository, or retrieves those data elements that occur in the invoice. With the data elements being defined in the system 116, the information identified by them can be displayed and otherwise processed as necessary. For example, information labeled as the seller's address can be automatically displayed in the proper portion of the screen and used in automatically tracking, or remitting payment on, the invoice. Therefore, the computer system 116 may view the received invoice by opening the communication document 122 using the software application 118. The invoice 124 is presented in the format specified by the software application 118.

Figure 2:
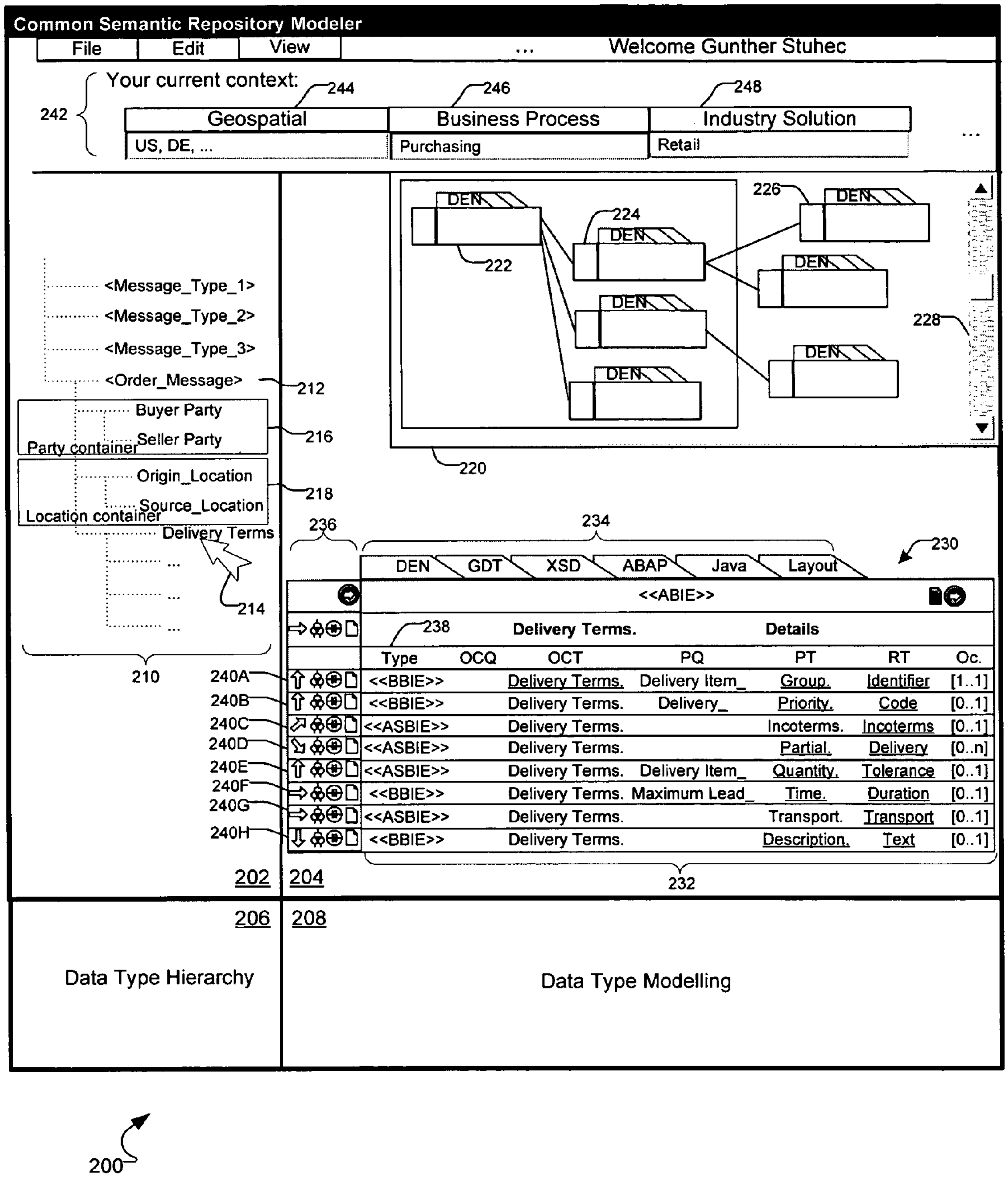
FIG. 2 shows a graphical user interface (GUI) for an embodiment of a modeling tool.

FIG. 2 shows a graphical user interface (GUI) 200 that the modeling tool 108 can generate. Using the GUI 200, a user can view or edit date elements such as aggregate data components and data types. The GUI 200 includes a data component hierarchy area 202, a data component modeling area 204, a data type hierarchy area 206, and a data type modeling area 208.

The data component hierarchy area 202 shows the hierarchical structure of the data components. A hierarchy 210 is arranged according to message types, which are the categories of electronic communications with which data elements can be used. The user can select any message type in the hierarchy 210 for modeling. Here, the hierarchy 210 includes three generic message types and an Order_Message type 212. The order message corresponds to a sales order, for example, which can be assembled for electronic transmittal using data elements. When a user selects any of the message types using a pointer 214, the hierarchy 210 displays at least one sublevel of components included in that message type. Here, the user has selected the Order_Message type 212.

The Order_Message type 212 includes several data components that can be included in the electronic order. The hierarchy 210 currently shows a Buyer Party, a Seller Party, an Origin_Location, a Source_Location and Delivery Terms as being part of the Order_Message type 212. These exemplary names are based on the CCTS and on ISO 11179-5 conventions. Other components thereof have been omitted here for simplicity. The hierarchy 210 may group some of the data components based on semantics. For example, a Party container includes the Buyer Party and the Seller Party. Similarly, a Location container 218 includes the Origin_Location and the Source_Location. The user can select any of the entries in the hierarchy 210 for modeling. Upon the selection, the corresponding data component is displayed in the data component modeling area 204. Here, the user has selected the Delivery Terms component.

The data component modeling area 204 is currently configured for the Delivery Terms component. First, the data component modeling area 204 contains an overview area 220 that illustrates the hierarchy of the selected component. For example, the overview area 220 shows that a component icon 222, which may be the currently selected component, includes several subcomponents 224, and that at least one of the subcomponents 224 includes at least one subsubcomponent 226. The overview area lets the user see the data component structure which can be useful in working with its semantics. The user can scroll the overview area 220 using a slide bar 228.

Second, the data component modeling area 204 visually presents a class, e.g. a delivery terms component 230, for the user to perform modeling and other operations. The delivery terms component 230 is presented using a semantic information area 232 reflecting the semantics of the selected data component, a physical representation area 234 reflecting the choices of physical representations that exist for this data component, and an extended features area 236 reflecting other aspects of the data component or other actions that can be performed thereon.

In this example, the selected data component is defined using the CCTS and the illustration therefore uses some terminology from that standard. For example, aggregate data components such as the delivery terms component 230 that are composed of several other data components are referred to by the term ABIE (cf. Aggregate Business Information Entity). Basic data components, which are not composed of any other data components, are referred to by the term BBIE (cf. Basic Business Information Entity). A association data component, which associates an aggregate data component with another aggregate data component, are referred to by the term ASBIE (cf. Association Business Information Entity).

The semantic information area 232 presents the semantics of the delivery terms component 230 in a way that is informative and useful for the modeler. First, the semantic information area 232 bears the name of the delivery terms component 230: "Delivery Terms. Details". Second, the semantic information area 232 includes a type column 238 that defines, for each of the components that make up the delivery terms component 230, whether the component is a BBIE or an ASBIE. Also, the semantic information area 232 presents selected semantics associated with each of the BBIEs and ASBIEs, as will be described.

Here, the delivery terms component 230 is currently made up of eight data components, including BBIE entries 240A, B, F and H, and ASBIE entries 240C, D, E and G. One example of operations that can be performed with the modeling tool 108, and using the exemplary GUI 200, is to add or remove entries for data components that make up an aggregate data component. Another example is that the user can open and edit any of the data components that make up an aggregate data component using its entry, which will now be described.

Figure 3A:
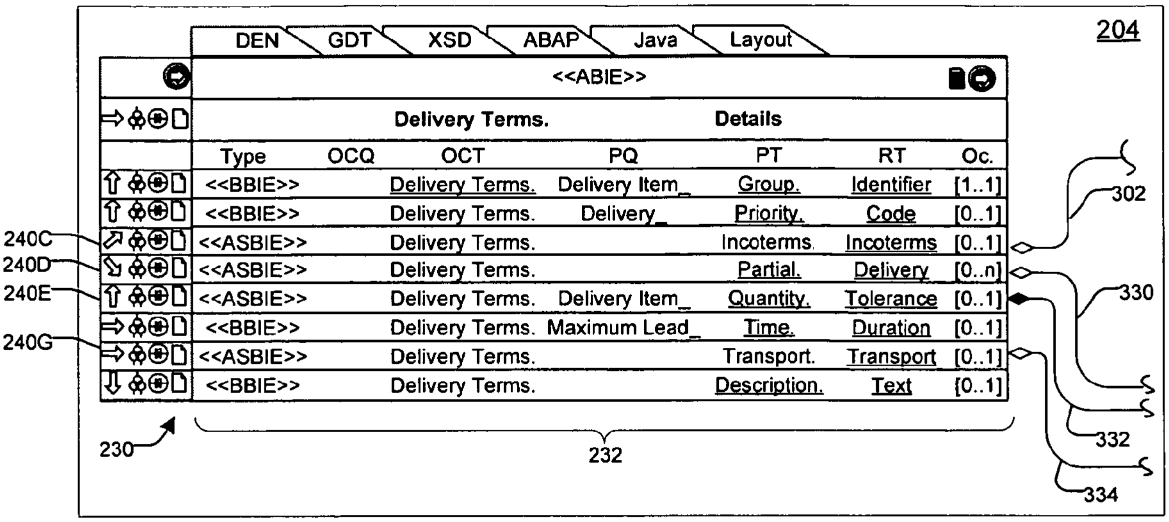
FIGS. 3A-B show an example of a data component being presented in the GUI shown in FIG. 2.
Figure 3B:
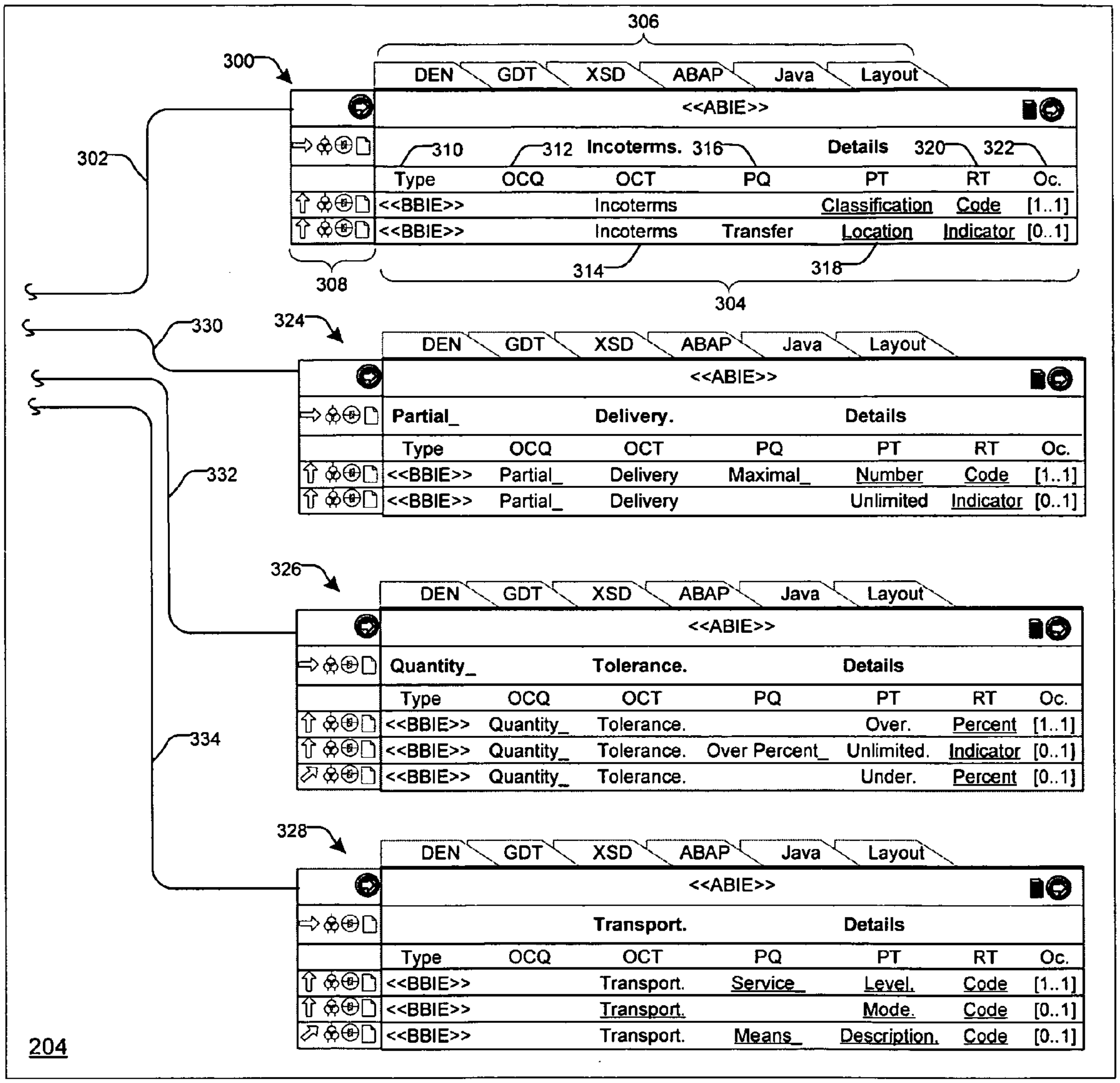

FIGS. 3A-B shown an example of how the data component modeling area 204 can appear upon the user selecting some of the entries for association data components of the delivery terms component 230 using the pointer 214. The contents of FIGS. 3A-B may be presented in the data component modeling area 204 at once, and is here divided between two figures for clarity. Also for clarity, FIGS. 3A-B show only the data component modeling area 204 and not the rest of the GUI 200.

First, upon the user selecting the data component entry 240C, an ABIE 300 corresponding to the entry is displayed in the data component modeling area 204. The ABIE 300 here is an Incoterms component that can define the application of Incoterms commercial terms to the delivery process. The association between the delivery terms component 230 and the ABIE 300 is visually illustrated using a connector 302. Thus, the connector 302 can be said to visualize the semantic that the delivery term 230 includes an association component, the ASBIE 240C, that associates the delivery terms component 230 with another aggregation component, the ABIE 300. Similarly to the delivery terms component 230, the ABIE 300 includes a semantic information area 304, a physical representation area 306 and an extended features area 308.

Being an aggregate data component, the ABIE 300 is made up from other data components. The semantic information area 304 includes several columns for presenting the semantic information of those components. The user can add, remove or edit information included in the semantic information area 304. First, a type column 310 indicates, for each component that is included in the ABIE 300, what type the component has. Here, both of the included components are basic data components and are therefore each marked BBIE.

Columns 312 and 314 specify an object class to which the respective data component relates. For example, this representation is based on CCTS and ISO 11179-5. The column 314 specifies a term for the object class (OCT), which here is Incoterms. An object class term is a part of a unique name of an data element that represents the object class to which it belongs. The column 314 may specify a qualifier for the object class (OCQ) and is here empty. Columns 316 and 318 specify a property to which the respective data component relates. The column 318 specifies a term for the property (PT) which in these examples are Classification and Location, respectively. A property term is a part of a unique name of a data element that expresses a property of an object class. The column 316 may specify a qualifier for the property (PQ) and is here empty for one of the components and for the other one is Transfer. Column 320 specifies a representation term (RT) for each of the data components. A representation term is a part of a unique name that represents the form of a set of valid values for a data element, due for example to the data element being defined as having a certain data type. Here, the representation terms are Code and Indicator, respectively. The object class terms, property terms, and representation terms may be those used with implementations of the CCTS standard.

A column 322 indicates the occurrence of each respective data component. This means the cardinality with which the data component occurs in relation to the ABIE 300. For example, one of the data components has an occurrence of [1 . . . 1] which means that this component occurs exactly once in the ABIE 300. In contrast, the other data component has an occurrence of [0 . . . 1], which indicates that zero or one such component may be included in the ABIE 300.

Similarly to the association component entry 240C, the user in this example also selects the association component entries 240D, E and G. This causes the corresponding data components to be displayed in the data component modeling area 204. Particularly, ABIE 324 is a partial-delivery details component corresponding to the ASBIE entry 240D, ABIE 326 is a quantity-tolerance details component corresponding to the ASBIE entry 240E, and ABIE 328 is a transport details component corresponding to the ASBIE entry 240G. The semantic that each of the ABIEs 324, 326 and 328 is associated with the delivery terms component 230 is visualized by respective connectors 330, 332 and 334. The connectors 302, 330 and 334 attach to the delivery terms component 230 using white diamonds, which represent "aggregations". Similarly, the connector 330 has a black diamond representing a "composition".

The delivery terms component 230 includes the semantic information area 232 that specifies similar information for the data components—including the ABIE 300—that make up the delivery terms component 230. Thus, the semantic information area 304 visualizes details about the semantics of each component that is included in the ABIE 300. The areas 306 and 308 will be described later.

Figure 4:
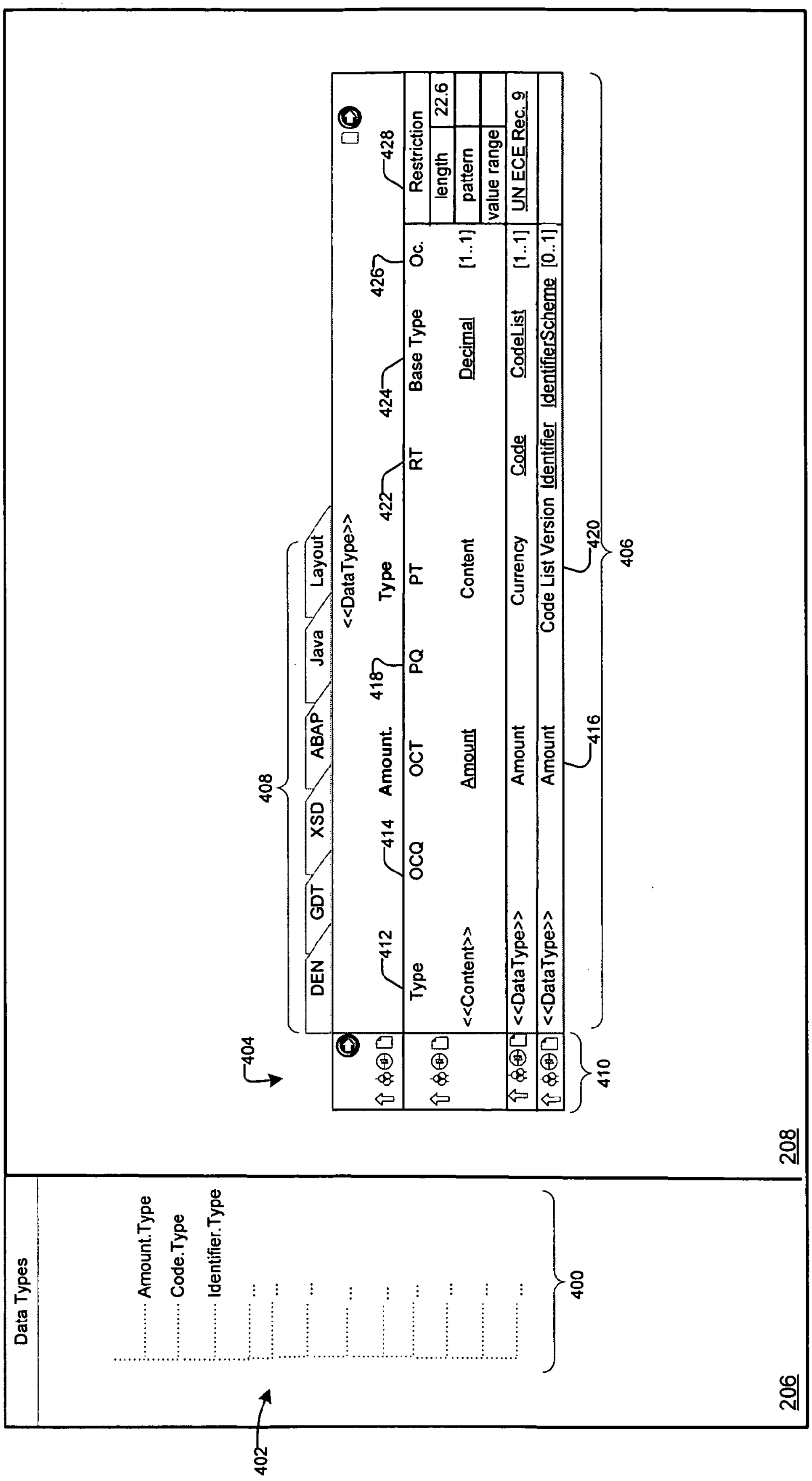
FIG. 4 shows an example of a data type being presented in the GUI shown in FIG. 2.

The user can model data types using the modeling tool 108. As shown in FIG. 2, the GUI 200 includes the data type hierarchy area 206 and the data type modeling area 208. FIG. 4 shows an example of how these areas can appear and operate. For simplicity, the drawing shows only the areas 206 and 208, and not the rest of the GUI 200.

The data type hierarchy area 206 contains a list 400 that lists some or all of the defined data types for user selection. Here, the user selects an amount type entry 402. Upon the selection, an amount type 404 is presented in the area 208. The amount type 404 includes a semantic information area 406, a physical representation area 408 and an extended features area 410. The latter two will be described later.

The semantic information area 406 includes columns that organize the semantic information similar to the semantic areas 232 and 304. Thus, the semantic information area 406 includes a type column 412, object class qualifier (OCQ) and object class term (OCT) columns 414 and 416, property qualifier (PQ) and property term (PT) columns 418 and 420, a representation term (RT) column 422, a base type column 424, and an occurrence column 426. The base type column 424 here first shows any of the physical "primitive types" (integer, string, decimal, float etc.) on which each data type is based. The XML Schema Built-In Types may be used for this primitive types. Additionally, the base type column 424 specifies whether the specific data type Code or Identifier is based on a codelist or is a specific identifier scheme, because each codelist or identifier scheme are based on their own primitive types. A restrictions column 428 will be described later. Thus, the amount type 404 is currently modeled to include a content that is in form of a decimal number, and a currency code that is determined using a code list of a specified version. The user can add, modify or delete any of the semantic information for the amount data type 404.

Figure 5:
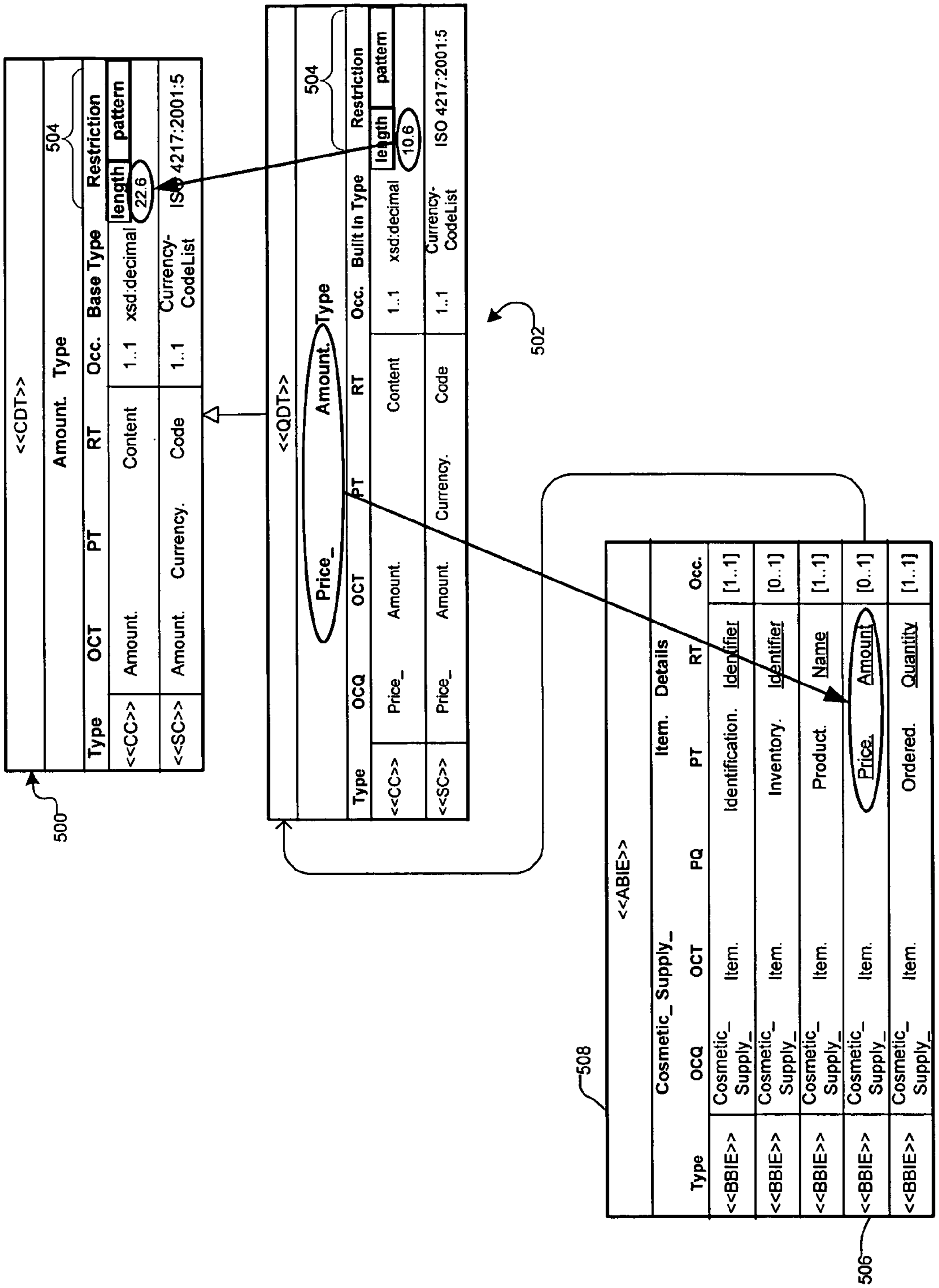
FIG. 5 shows an example of a data type relationship and inheritance including the data type shown in FIG. 4.

Particularly, the user can create a qualified data type that is based on the amount type 404. The amount type 404 may then be considered the core data type for the created qualified data type. FIG. 5 schematically shows the relationship between such data types. A core data type 500 is here an amount type that has some differences compared to the amount type 404. Particularly, the core data type 500 consists of an amount (a decimal number) and a currency code. Similarly, a qualified data type 502 for a price amount, having the same overall structure as the core data type, is being created.

The data types 500 and 502 have a restriction field 504 that lists the restriction, if any, that applies to the corresponding aspects of the data types. For example, the restriction in the data type 500 specifies that the decimal amount can have a length of "22.6". In contrast, the restriction in the qualified data type 502 specifies that the length can be "10.6". Thus, the qualified data type 502 further restricts the definition in the core data type 500. In contrast, the code list in the core data type 500 is specified to be based on the standard ISO 4217:2001:5, and the restriction field 504 in the qualified data type 502 specifies the same information. Thus, the qualified data type 502 does not further restrict the available code list.

One or more data components can be created based on the created qualified data type. Here, the qualified data type has been used as the basis for a BBIE 506. Per the semantics of the qualified data type, the BBIE 506 represents a price amount. The price amount has been included in an ABIE 508 that represents details of a cosmetics supply item. Thus, the qualified data type is being used to specify price amounts for cosmetics supply items. It is also possible to change the codelist ISO 4217:2001:5, or the user can define more codelists for the same supplementary components and specify which codelist is the default codelist at runtime.

Figure 6:
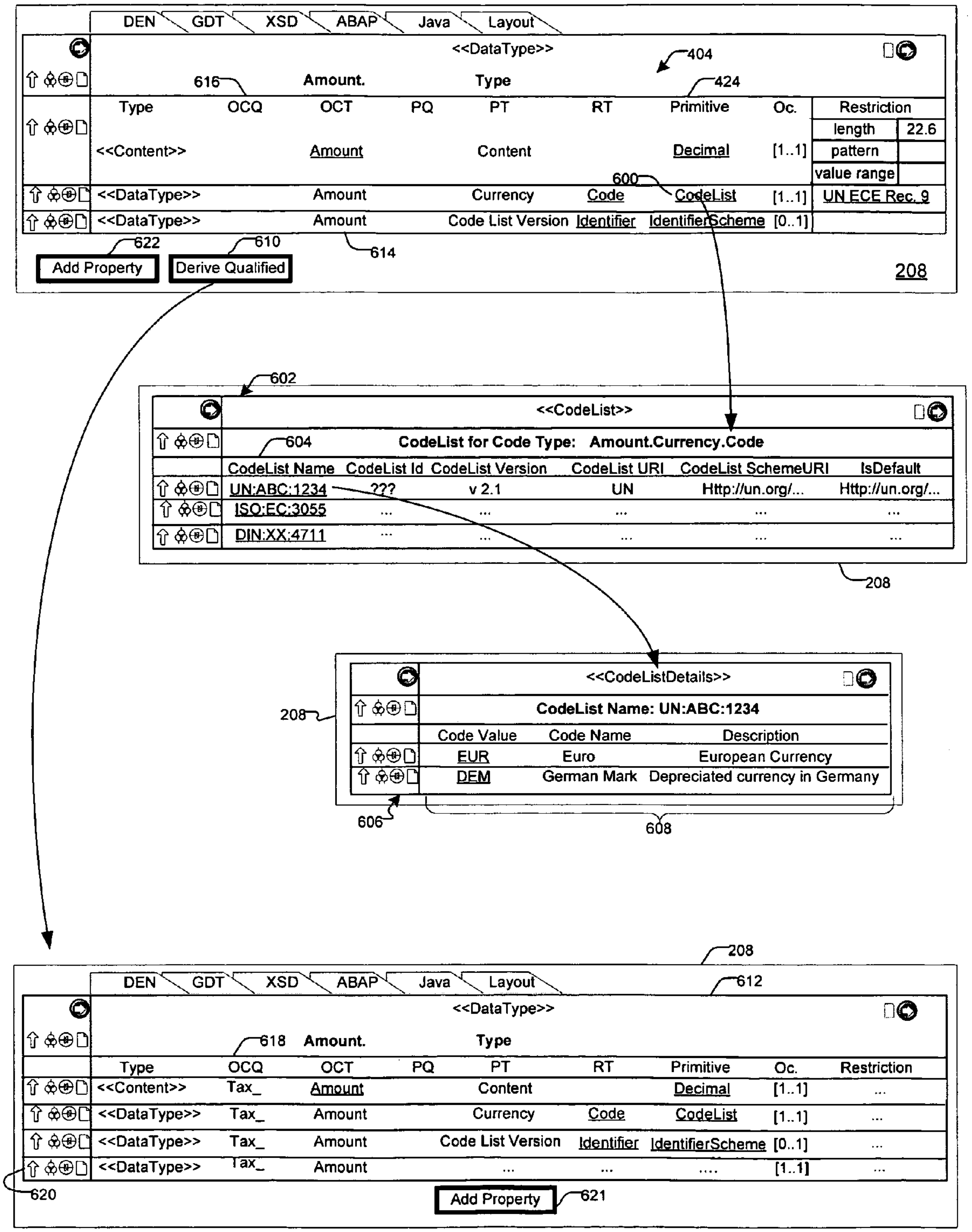
FIG. 6 shows examples of modeling using the data type shown in FIG. 4.

FIG. 6 shows examples of how the user can revise the definitions in the amount type 404 and how additional data types can be created. First, the user can explore a particular semantic if the data type in depth. The primitive column 424 includes a CodeList entry 600 that represents the particular codelists that can be used in the component that is based on the data type. The user can select the entry 600 to cause a code list 602 to be presented in the data type modeling area 208. Here, the data type 404 ceases to be presented in the area 208 when the code list 602 is presented. In other implementations, the data type 404 and code list 602 may be simultaneously presented in the area 208. The semantics of the amount currency code in the data type 404 is provided by the code list 602. If more than one codelist is defined for one specific data type or supplementary component, it is possible to define a default codelist that will be used in runtime if no additional parameters "CodeList ID, CodeListVersion . . . " are be transmitted. Additionally the columns CodeListID, CodeListVersion etc. represent the specific supplementary components for uniquely identifying a codelist.

Similar to other exemplary visual representations described above, the code list 602 includes a semantic information area with a number of columns. A first column 604 presents the names of the code lists on which the amount currency code can be based. For each of these entries, there can be presented a details area that shows the list of codes included in the selected entry. Here, the user selects a first illustrative entry that reads: UN:ABC:1234, prompting the system to present a code list detail area 606 in the area 208. The code list area can be displayed together with, or replace, any of the data type 404 and the code list 602.

The code list detail area 606 includes a semantic information area 608 that includes several columns with semantic information. Here, the semantic information is: the code itself, the name and an additional description. For example, there are different code values corresponding to currencies such as the Euro and German Marks. The code list detail area 606 may include more entries than shown in this example.

Second, the user can use the data type 404 to derive a qualified data type. The data type modeling area 208 includes a control 610 labeled "Derive Qualified". Upon the user selecting this control while the data type 404 is being presented, there is presented in the area 208 a template from which the user can create a qualified data type 612. The qualified data type 612 can be displayed in the area 208 together with, or replace, the data type 404.

Upon being initially displayed, the template for the qualified data type 612 may contain the information that is included in the data type 404. The user can then add, remove or modify any information to create the qualified data type. Here, the user has introduced a qualifier for the object class and added another data type to the list. First, the data type 404 includes a column 614 for the object class term, which in this example is Amount. Next to it is a column 616 to hold qualifiers for the object class, which column is currently empty. This means that the data type 404 specifies the term for the object class to be Amount but it does not specify any qualifier for the term.

The qualified data type 612, in contrast, should specify a Tax qualifier for the object class. The user therefore enters the term Tax in a column 618 of the qualified data type 612. This means that the qualified data type 612 relates not just to any type of amount by particularly to a tax amount. The user can modify any of the other semantic information in the qualified data type 612 as necessary to implement the tax amount data type.

Second, the user has added a data type entry 620 to the qualified data type 612 that is not present in the data type 404. The new entry 620 is generated upon the user selecting an Add Property control 621. So far, the entry 620 is characterized by being a data type and that the object class is a tax amount. The user enters values for other semantic information to further specify the entry 620.

In the data type 404, new entries can be made using an Add Property control 622. For example, the user can make a new entry that is a data type and that has semantic information different from the entries that already exist. The GUI 200 includes controls (not shown) for performing operations such as saving and deleting on any of the elements being modeled. Thus, the user can save the newly created qualified data type 612 or the modified data type 404.

Similarly, new entries can be made in the data components, such as in the delivery terms component 230. There will now be described with references to FIGS. 7A-I an example of adding a basic data component for a sales tax that is levied on labor services. The result will be that the specific BBIE or ASBIE will be recognized in only the set context, shown by the values in each context category.

Figure 7A:
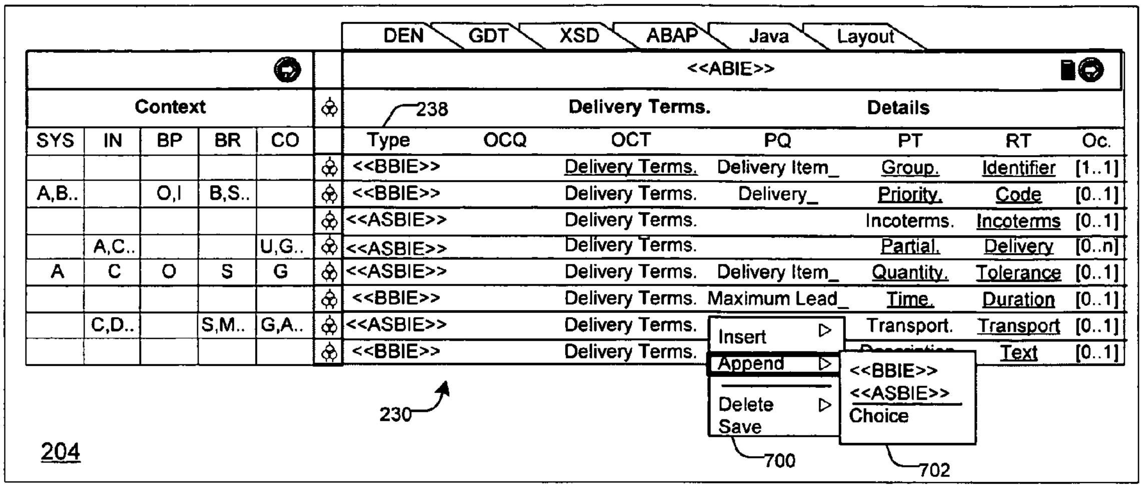

FIG. 7A shows the delivery terms component 230 being presented in the data component modeling area 204. For simplicity, the remainder of the GUI 200 is not shown in the drawing. The type column 238 indicates that the component 230 is made up of a number of BBIEs and ASBIEs.

Figure 7B:
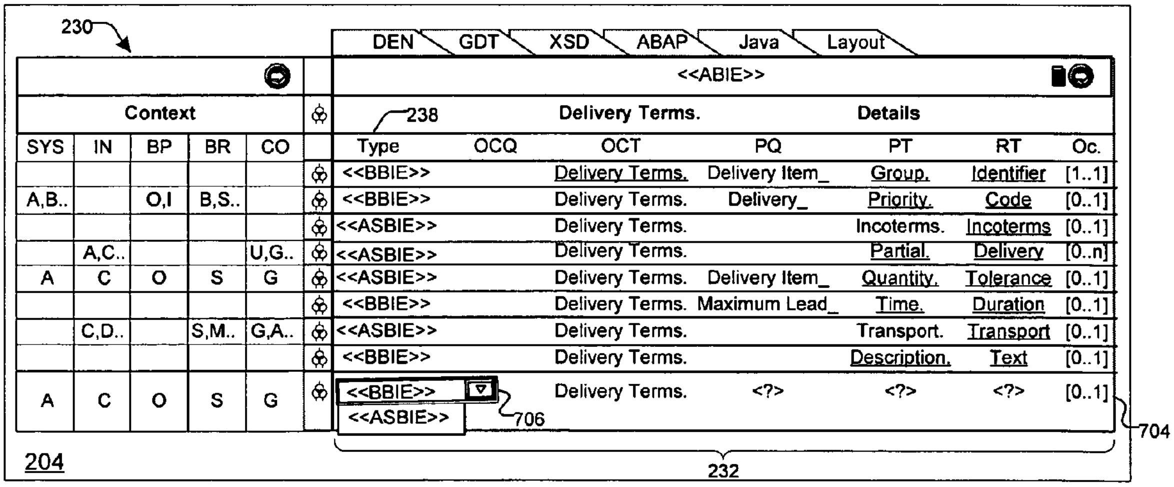

The user wishes to add another BBIE and therefore opens a menu 700 for creating new entries. The menu 700 may be a context menu available by clicking a right mouse button (not shown). In the menu 700, the user selects an Append command to instruct the system to append another entry to the delivery terms component. This causes a submenu 702 to be presented, here offering the user a choice between creating a BBIE or an ASBIE. As shown in FIG. 7B, the system appends a new BBIE entry 704 at the end of the semantic information area 232 upon the user selecting the BBIE command.

The BBIE entry 704 is defined as a BBIE in the column 238 and inherits the term (Delivery Terms) for the object class from the delivery terms component 230. Remaining fields for the BBIE entry 704 in the semantic information area 232 are empty at this point. A component selection control 706 lets the user redefine the BBIE entry 704 as an ASBIE (or any other available type of component), if the user so chooses. Here, however, the user does not change the BBIE entry 704 into any other type of component.

Figure 7C:
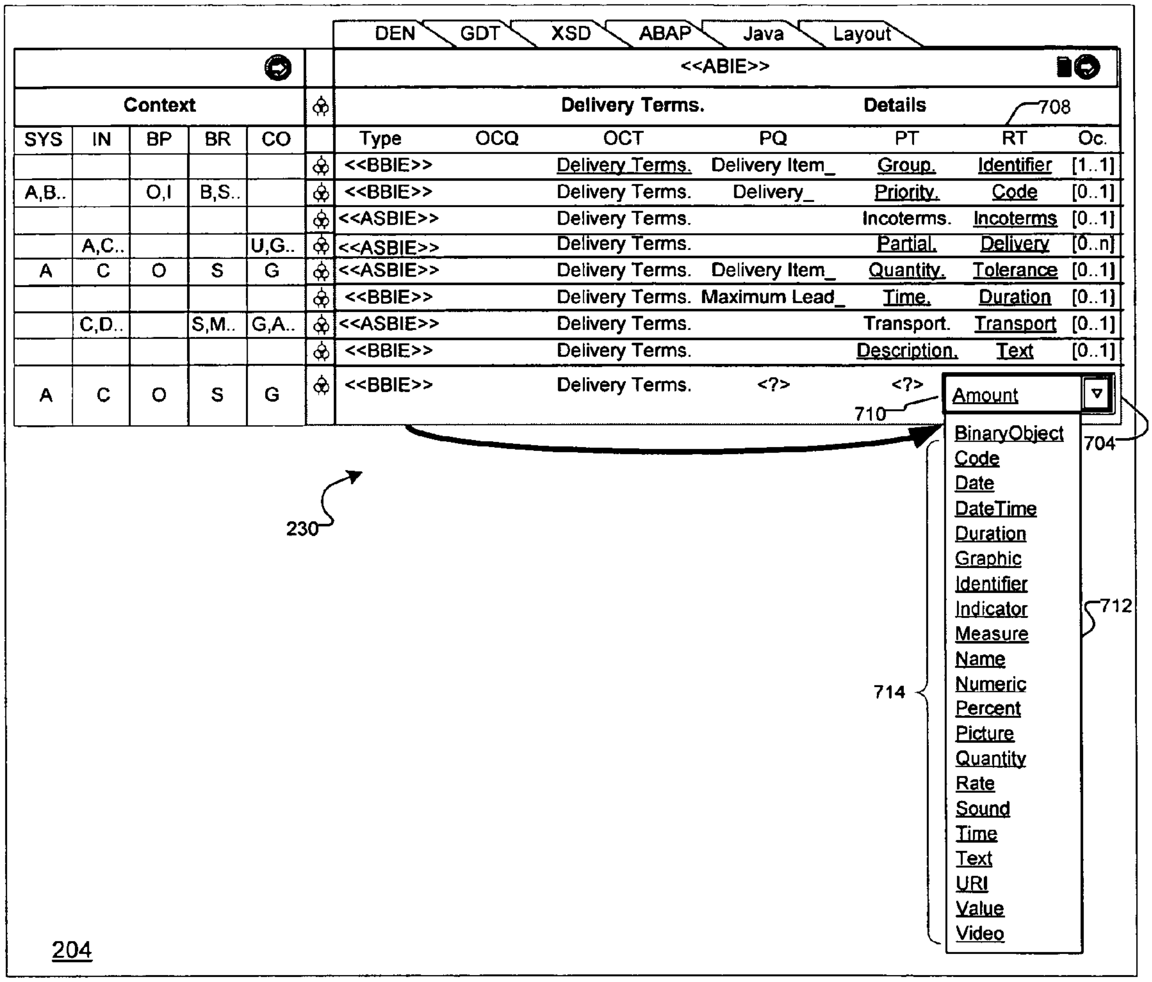

As shown in FIG. 7C, the user can next define a representation term for the BBIE. A representation term column 708 lists the data types upon which the existing components are based, for example the code data types, which is a fixed list of the smallest pieces of CCTS-defined data types. For the BBIE entry 704, the representation term column 708 presents a control 710 for selecting between predefined data types. Upon the user selecting the control 710, there is displayed a menu 712 that presents a list 714 of the available data types. Here, the user selects Amount in the list 714 as the data type for the BBIE entry 704.

FIG. 7D shows the delivery terms component 230 in the area 204 after Amount has been specified as the data type for the BBIE entry 704. The semantic information area 232 includes a column 716 that specifies the property term for all included components. For the BBIE entry 704, the column 716 displays a control 718 for selecting between predefined property terms for the BBIE. Upon the user selecting the control 718, a menu 720 is displayed that contains a list 722 of available property terms.

The available property terms depend on the representation term selected in the column 708 (see FIG. 7C). The list 722 is populated depending on the user's choice of data type. The list 722 contains some property terms that are underlined (here, Deductible and Tax), and some that are not underlined (e.g., Expected and Upper). The underlining indicates that the property term relates to a qualified data type. A non-underlined property term, in contrast, relates to an unqualified (or core) data type. Qualified data types are based on core (or unqualified) data types. All the terms represented in RT are originally based on core data types. If the term in PT is underlined, this means that the specific BBIE is based on a qualified data type—e.g. "Deductible". This restriction is also described with regard to FIG. 5, which also shows the determination of unqualified and qualified data types. Some of the BBIEs are restricted (based on qualified data types) and others are not (based on core data types), and that difference is visualized by selective underlining. Here, the user selects Tax, which is underlined because the qualified data type—Tax_Amount. Type—is restricted.

FIG. 7E shows the delivery terms component 230 in the area 204 after Tax has been specified as the property term for the BBIE entry 704. The semantic information area 232 includes a column 724 for specifying a qualifier for the property that the term selected in column 716 represents. The column 724 displays a control 726 for the user to select one of several predefined qualifiers. Upon the user selecting the control 726, a menu 728 is displayed that presents a list 730 of available qualifiers.

The available qualifiers depend on the property term selected in the column 716. The list 730 is populated depending on the user's choice of property term. The list 730 contains some qualifiers that are underlined (here, Insurance and <?>Sales), and some that are not underlined (e.g., Goods and Value Added). Underlining reflects the nature of the qualified data type on which this BBIE is based. The underlining indicates that this BBIE is based on a more restricted qualified data type, for examples as described in FIG. 5, than the non-underlined entries. The name of this qualified data type is Sales_Tax_Amount. Type. This qualified data type may be restricted in length. A non-underlined qualifier, in contrast, indicates that it is based on a less restricted qualified data type, for example as shown in FIG. 5. The qualified data type is "Tax_Amount. Type", which might have a longer length than "Sales_Tax_Amount. Type". Here, the user selects <?> Sales, one of the underlined qualifiers. The portion "<?>" means that the Sales qualifier in turn has some additional qualifiers.

FIG. 7F shows the delivery terms component 230 in the area 204 after <?> Sales has been specified in the column 724 as the property qualifier for the BBIE entry 704. The <?> component of the property qualifier indicates that the Sales qualifier represents a collection of different qualifiers. The user should choose one of the collection of qualifiers to further specify the property qualifier. FIG. 7G shows that the column 724 displays a control 726 for choosing between the qualifiers. Upon the user selecting the control 726, there is presented a menu 728 for making the selection. The menu 728 contains a list 730 of the available qualifiers, wherein each of the entries in the list 730 is to be combined with the Sales qualifier that is already listed in the column 724. Here, the user selects the Labour entry.

Figure 7H:
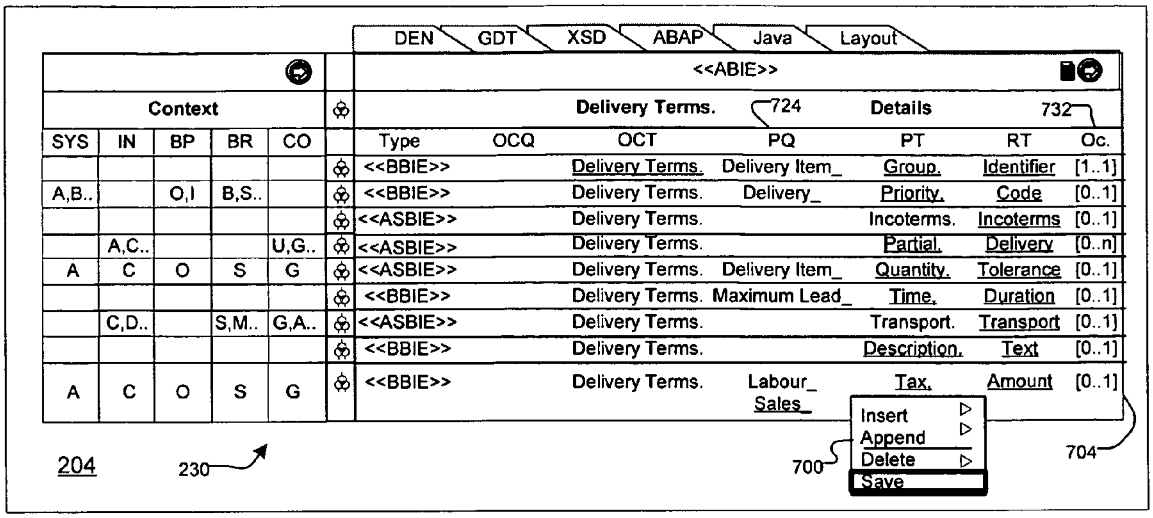

FIG. 7H shows the delivery terms component 230 in the area 204 after Labour_Sales has been specified in the column 724 as the property qualifier for the BBIE entry 704. The occurrence of the BBIE entry 704 is specified in a column 732, which currently indicates that the BBIE entry 704 occurs zero or one time in the delivery terms component 230. The user could change the entry in the column 732 to another value, such as [1 . . . 1], meaning "exactly once". Here, however, the user decides not to change the specified cardinality.

Figure 7I:
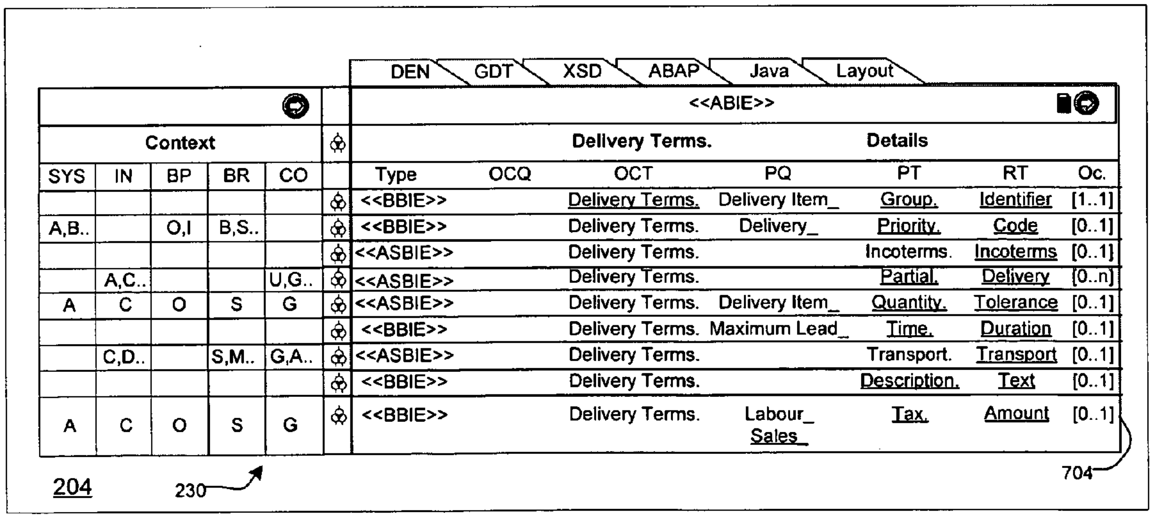

This concludes the creation of the new BBIE entry 704 in this example. The user should therefore save the modified delivery terms component 230 to make sure the changes are persisted in the system. The user therefore again triggers the menu 700 and selects the Save command, initiating the system to save the changes to the delivery component 230, for example in the repository 126 (see FIG. 1). FIG. 7I shows the delivery terms component 230 in the area 204, including the semantics added by the new BBIE entry 704.

The modified delivery terms component 230 can be used, in one or more electronic communications, to identify delivery terms information. Particularly, if the semantics of such information should include a sales tax that is levied on labor services, that portion of the information can be identified using the new BBIE entry 704. This new modeled BBIE can also be submitted to the repository 126, for informing others that this specific BBIE is required in the given context. The context specificity is represented by setting a value for every context category in which this BBIE will be used (an example will be described below with reference to FIG. 8). If another user, in another context, needs exactly the same new BBIE that user can add his or her context values to the given context categories.

With reference again to FIG. 2, the GUI 200 includes a context display area 242 showing the current context that the user is working in. The context is determined by many factors relating to the current situation, such as the type of computer system, the relevant industry, the particular business process at issue and the user's role within the business process. The context display area 242 includes fields for some or all of the context categories to indicate the particular context in which the data component or data type is being modeled. Here, the area 242 shows a geospatial field 244, a business process field 246 and an industry solution field 248, and other categories may be included as well. Entries in these fields indicate that the geospatial context includes the United States and Germany, that the business process is Purchasing and that the industry solution is retail.

The user can thus model data components and data types that are relevant (and valid) in the context specified in the area 242. The context values are fixed and may be set once at the beginning of modeling a new message type using the area 242. If the user adds or deletes a BBIE or ASBIE, the context category values in this area will be filled automatically with the set values. Particularly, the delivery terms component 230 is valid in the context specified by the current settings in the area 242. However, with regard to the elements (components or data types) that make up the component 230, the user may wish to model them such that they are only relevant in a particular situation; that is, in a specified subcontext. The modeling tool 108 therefore provides that the user can edit context values for individual elements of the delivery terms component 230. Thus, the setting or modifying values for specific context categories may be considered a "user exit" approach because the modifications are typically done by, or on behalf of, the customer of the system.

Figure 8:
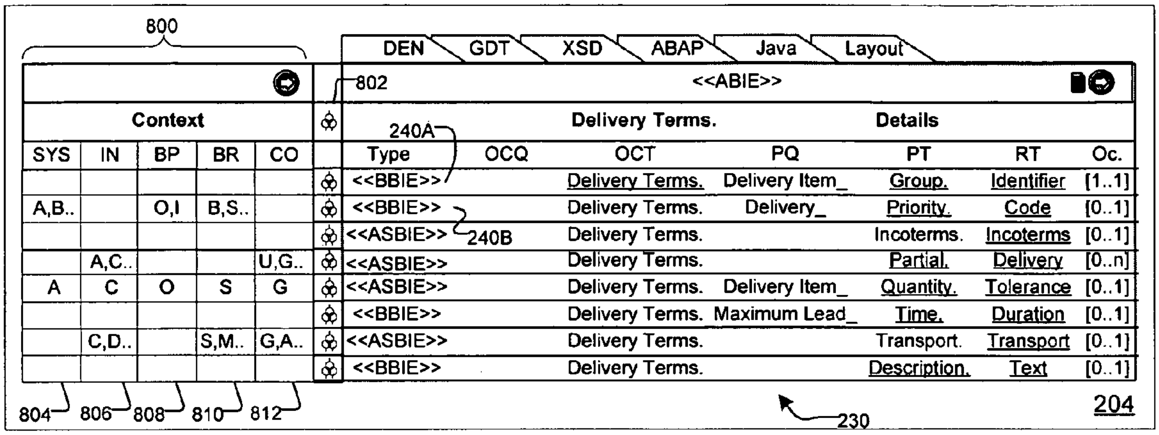
FIG. 8 shows another example of modeling using the data component shown in FIG. 2.

Using a control in the extended features area 236, the user opens, as shown in FIG. 8, a context category area 800 in which edits can be made to the context values that specify the context relevance of the delivery terms component 230. The content values indicate in which context every BBIE or ASBIE can or cannot be used. The area 800 may be presented upon the user selecting a context control 802 that is also shown in FIG. 2. In a relatively small GUI, it may not be possible to show all context values in their entirety. Instead, the user may hover the cursor over any specific symbol to cause a tag about the context value(s) to be shown. FIG. 8 shows the delivery terms component 230 being presented in the area 204. The delivery component here appears essentially as it does in FIG. 2, meaning that it has not been modified as described in the FIGS. 7A-I example.

The context category area 800 includes a system context column 804, an industry context column 806, a business process context column 808, a business process role context column 810 and a country context column 812. Each BBIE and ASBIE in the delivery terms component 230 can have its own values, or no values, entered in any of the columns in the context category area 800.

Here, the first BBIE entry 240A has no values entered in the context category area 800. This means that the BBIE corresponding to the entry 240A is relevant (and valid) for every context in which the delivery terms component 230 can be used. The BBIE entry 240B, in contrast, has exemplary values entered in the system context column 804, the business process context column 808 and the business process role context column 810. Each value represents a particular context in the corresponding category. This means that the BBIE corresponding to the entry 240B can be used only in a context that is: (a) characterized by a computer system denoted as A or B; (b) characterized by a business process denoted as O or I; and (c) characterized by the user having a business process role denoted as B or S. The other BBIEs and ASBIEs have other values, or values in other columns, as shown.

Thus, the context category values can be user specified, and existing values presented, using the context category area 800. Similar context category areas can be caused to appear using corresponding controls in the extended features area 308 (for the components in the BBIE 300, see FIG. 3B) or in the extended features area 410 (for the data types of the amount type 404, see FIG. 4).

Figure 9:
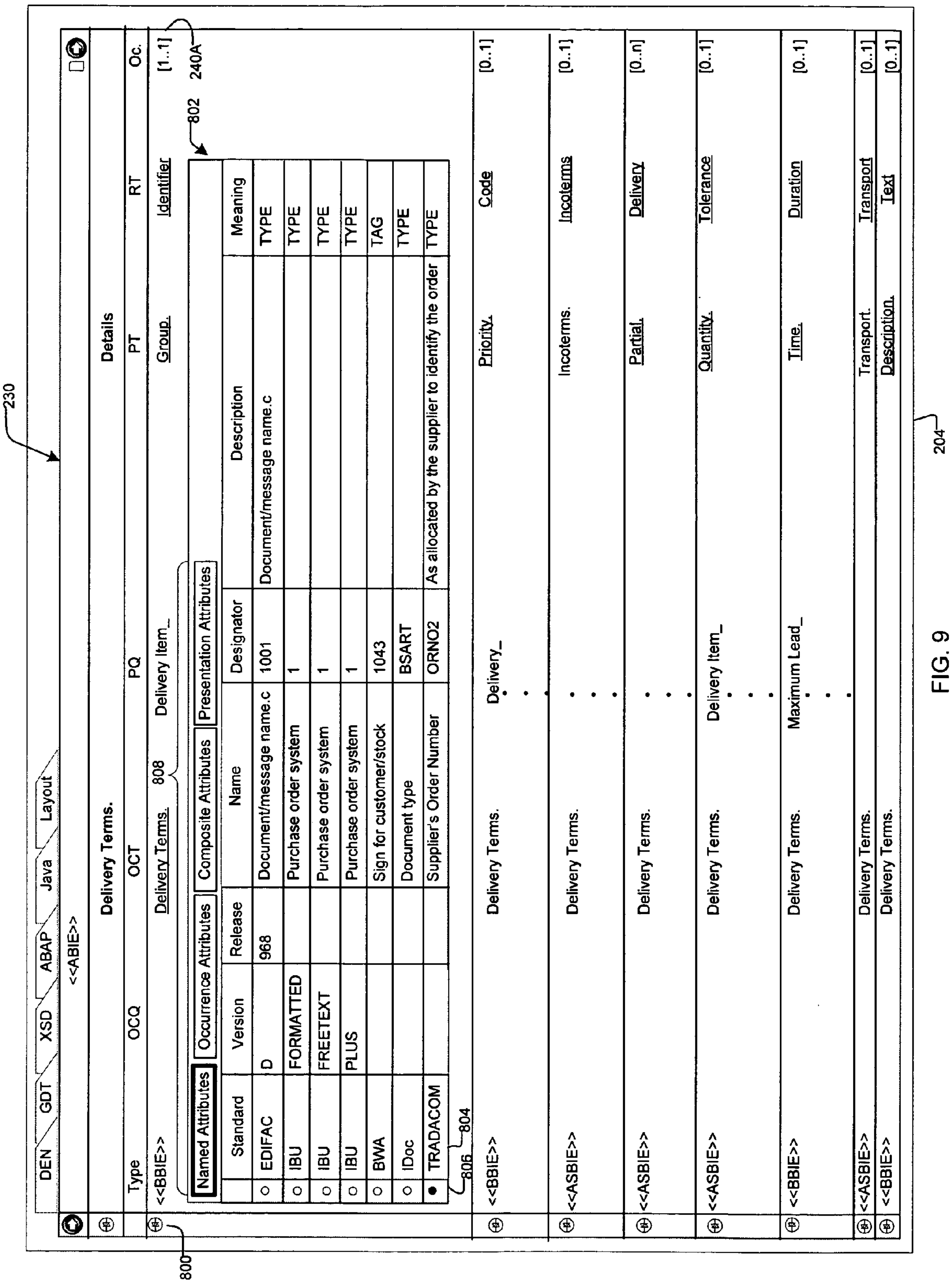
FIG. 9 shows an example of the data component shown in FIG. 2 presenting existing mappings to components in other standards.

Another control in the extended features area 236 initiates a presentation that indicates mappings between the selected data component or data type and items of the same or similar semantics in selected standards. FIG. 9 shows the delivery terms component 230 presented in the area 204 after the user selects a control 800. There is now displayed a standards mapping area 802 for the BBIE corresponding to the first BBIE entry 240A. The standards mapping area 802 identifies the corresponding node(s) of other standards. A column 804 identifies the items of several standards with the same or similar semantics. A column 806 contains an indicator (e.g., filled or unfilled circle), indicating whether the mapping is exact or approximate. Here, the standards include EDIFACT, IBU and others.

For each item of a standard, the user can see the particular version name, release number, name, designator, description and meaning of the item sharing the semantics with the selected component. The mapping may be created using a semi-automatic mapping. A group 808 includes controls that can be selected to view additional information. For example, a Named Attributes control provides a register for information about the standard, definitions used therein and the naming rule used. An Occurrence Attributes control provides a register for characteristics like occurrence and position. Position means the exact (absolute) position that the specific item has in the data tree of the business standard. With controls similar to the control 800, areas corresponding to the area 802 can be presented for any of the BBIEs or ASBIEs in the delivery terms component 230.

Figure 10A:
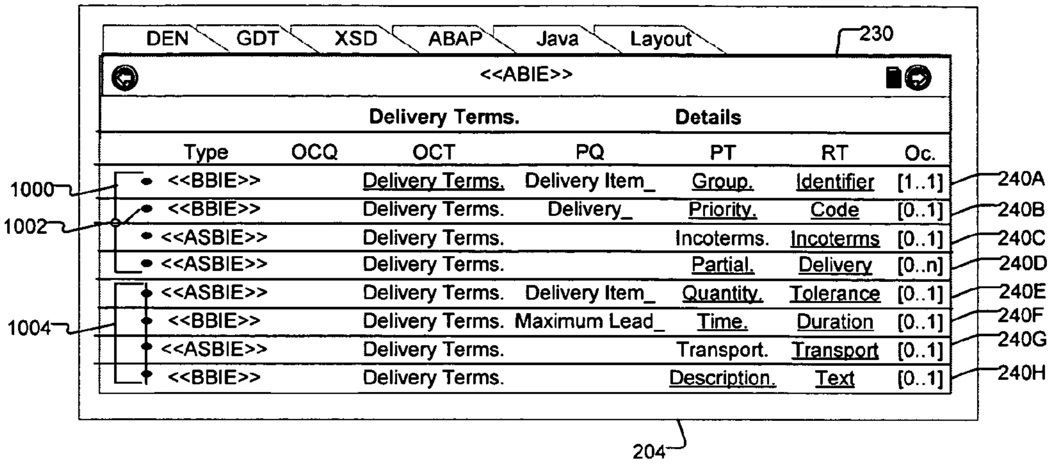
FIGS. 10A-B show examples of using choices or sequences when modeling the data component shown in FIG. 2.

Data components may be grouped or sequenced using the modeling tool 108, and examples thereof will now be described with reference to FIGS. 10A-B. FIG. 10A shows the delivery terms component 230 in the area 204. Here, the user has added a choice control 1000 that is associated with the following four entries: the BBIEs 240A and B and the ASBIEs 240C and D. For example, the user adds the choice control upon determining that two or more components in the delivery terms component 230 are alternative and that only one of them should be used in particular situations. The user may add the choice control 1000 by dragging it onto the component 230 from elsewhere in the GUI 200 and adapting it to include the necessary number of components (here: four).

The user who is modeling the delivery terms component 230 need not select which of the alternative components should be used. Rather, that choice can remain flexible in the modeling such that the end user of the delivery terms component 230 can enter the choice based on the situation in which the component is being implemented. The choice control 1000 includes a pointing feature 1002 that identifies the selected, active, component. The non-selected components will remain inactive until a different choice is made using the choice control 1000.

The user has also added a sequence control 1004 that is associated with the following four entries: the ASBIE 240E, the BBIE 240F, the ASBIE 240G and the BBIE 240H. The user adds the sequence control 1004 to indicate a particular sequence among the selected components. The sequence may correspond to dependencies between the components that the user purposely created in the modeling. As another example, the user may have noticed a necessary ordering that is implicit in data components created by someone else. In some implementations, a choice will be decided in runtime. For example there may be a "Project. Start. Date" and a "Project. Start. Date Time". The exact usage of these two BBIEs could only be decided in runtime, and it is therefore better to bring them into a choice. The user may add the sequence control 1004 by dragging it onto the component 230 from elsewhere in the GUI 200 and adapting it to include the necessary number of components.

The choice controls 1000 and sequence controls 1004 can be nested. First, FIG. 10B shows that the delivery terms component 230 is modified to include a first choice control 1000A for the BBIEs 240A and B. Similarly, a second choice control 1000B is included for the BBIEs 240C and D. A sequence control 1004A is associated with the BBIEs 240A and B and the ASBIEs 240C and D. This means that the sequence defined by the sequence control 1004A will include the one of the BBIEs 240A and B selected using the first choice control 1000A, followed by the one of the ASBIEs 240C and B selected using the second choice control 1000B.

Figure 10B:
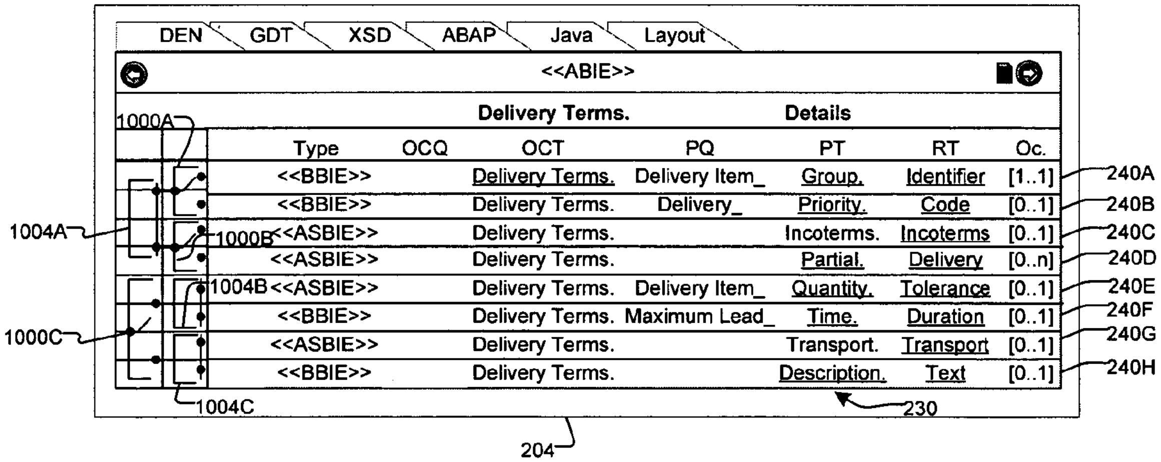

Second, FIG. 10B also shows that the delivery terms component 230 is modified to include a first sequence control 1004B for the ASBIE 240E and the BBIE 240F, and a second sequence control 1004C for the ASBIE 240G and the BBIE 240H. A choice control 1000 has been added to indicate a choice between the two sequence controls 1004B and 1004C. This means that the choice made with the choice control 1000C is either the sequence of the ASBIE 240E and the BBIE 240F, or the sequence of the ASBIE 240G and the BBIE 240H.

With reference again to FIG. 2, the current choice in the physical representation area 234 is a dictionary entry name (DEN) representation in which the semantics of the component 230 are presented in the semantic information area 232. The physical representation area 234 indicates the choices of physical representations, or syntaxes, that are available for the delivery terms component 230. The choices available in this example are: a global data type (GDT) representation which is an implementation of the CCTS standard used in some products available from SAP AG in Walldorf (Baden), Germany; an XML schema definition (XSD), an ABAP representation according to the ABAP programming language used in products available from SAP AG; a Java representation and a layout representation. The following examples illustrate the choices of representations in the area 234.

Figure 11A:
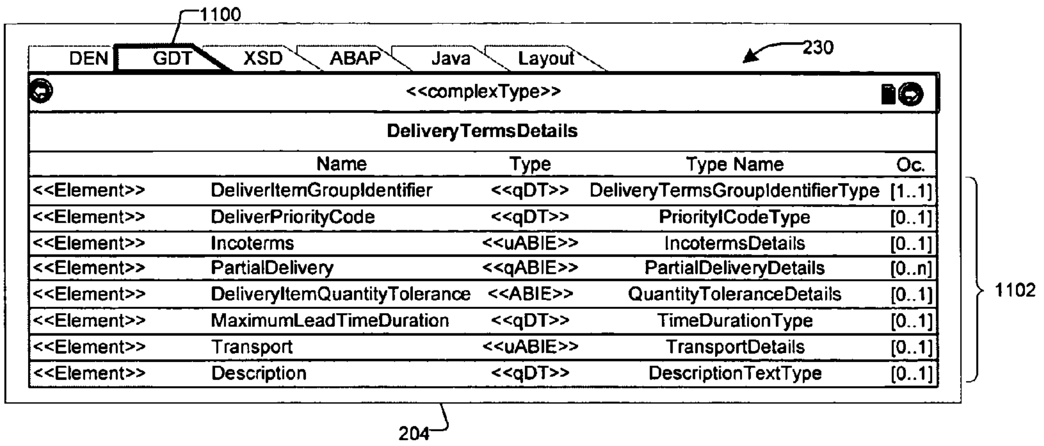
FIGS. 11A-C show examples of the data component shown in FIG. 2 being visualized using different representations.

First, FIG. 11A shows the delivery terms component 230 in the area 204, wherein the user has selected a tab 1100 corresponding to the GDT representation. The delivery terms component 230 is now represented in form of a list 1102 of the GDT components that implement the particular semantics of this component. Each of the elements in the GDT representation is characterized by its name, type and type name.

Figure 11B:
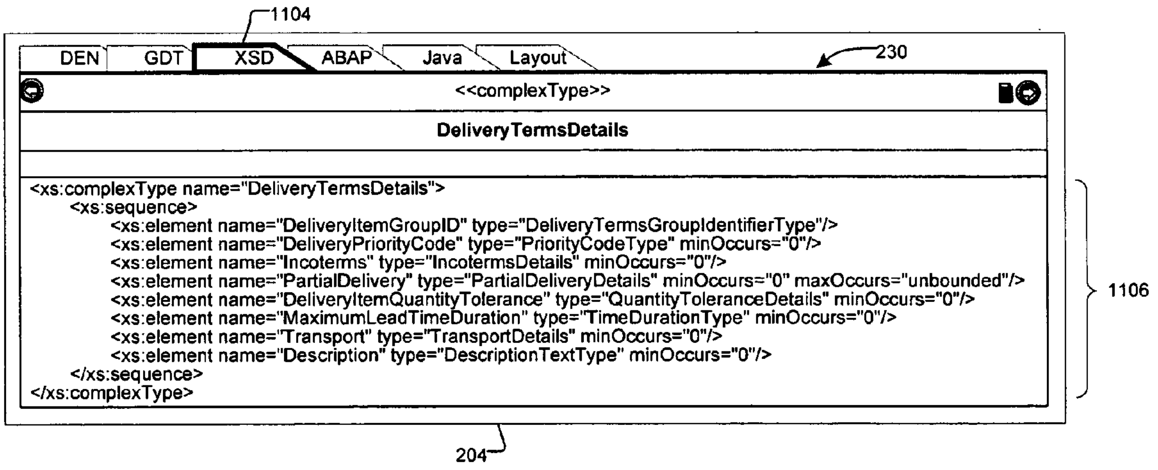

Second, FIG. 11B shows the delivery terms component 230 in the area 204, wherein the user has selected a tab 1104 corresponding to the XSD representation. The delivery terms component 230 is now represented in form of code 1106 that implements the particular semantics of this component. For example, the code 1106 includes particular code portions such as "DeliveryItemGroupID" and "DeliveryPriorityCode," which correspond to the BBIE entries 240A and B, respectively.

Figure 11C:
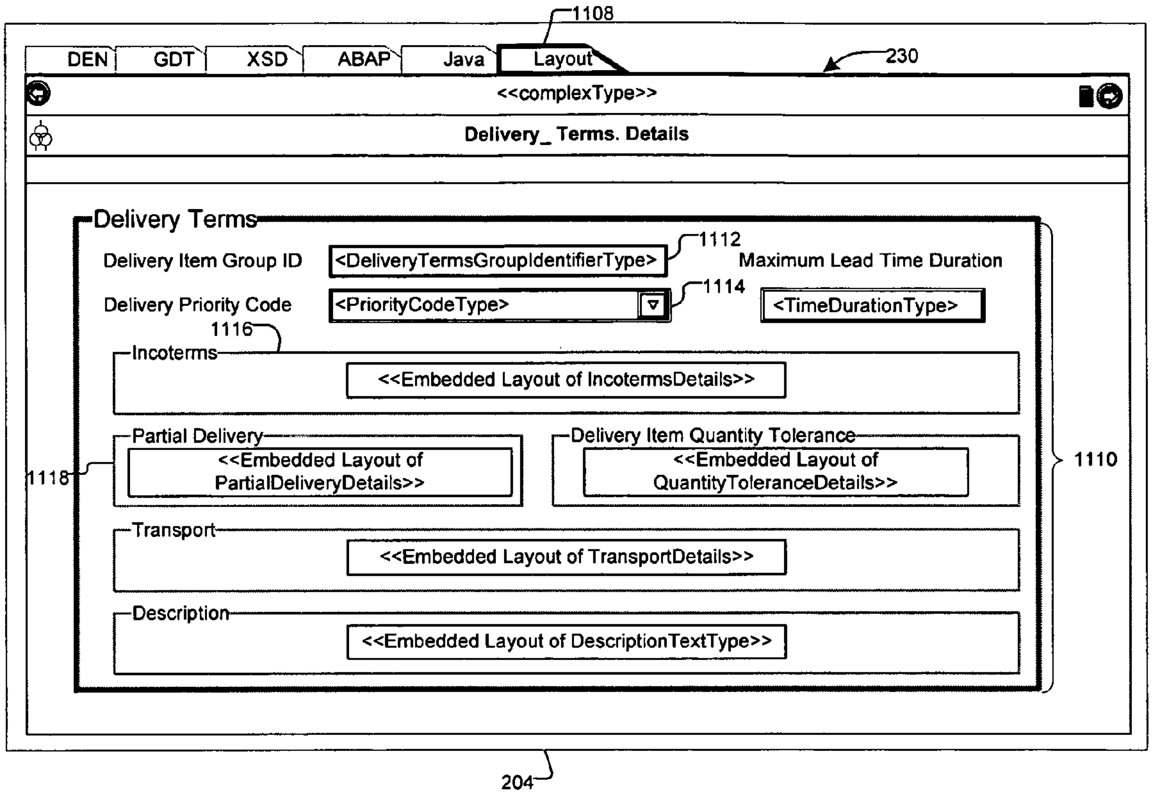

Third, FIG. 11C shows the delivery terms component 230 in the area 204, wherein the user has selected a tab 1108 corresponding to the Layout representation. A layout 1110 for the delivery terms component is shown in the area 204. The layout 1110 is a representation that shows the relative layout of the BBIEs and ASBIEs as they appear on a display device. For example, the layout indicates that the BBIE corresponding to the entry 240A may be represented as a text input field 1112 in the layout 1110. Similarly, the BBIE corresponding to the entry 240B may be represented as a drop down menu box 1114. There may be full-width layout features, such as a wide box 1116 for the ABIE corresponding to the ASBIE entry 240C, or limited-width layout features, such as a narrow box 1118 for the ABIE corresponding to the ASBIE entry 240D. The layout 1110 may be generated using layout information embedded in the definition of the corresponding component.

Figure 12A:
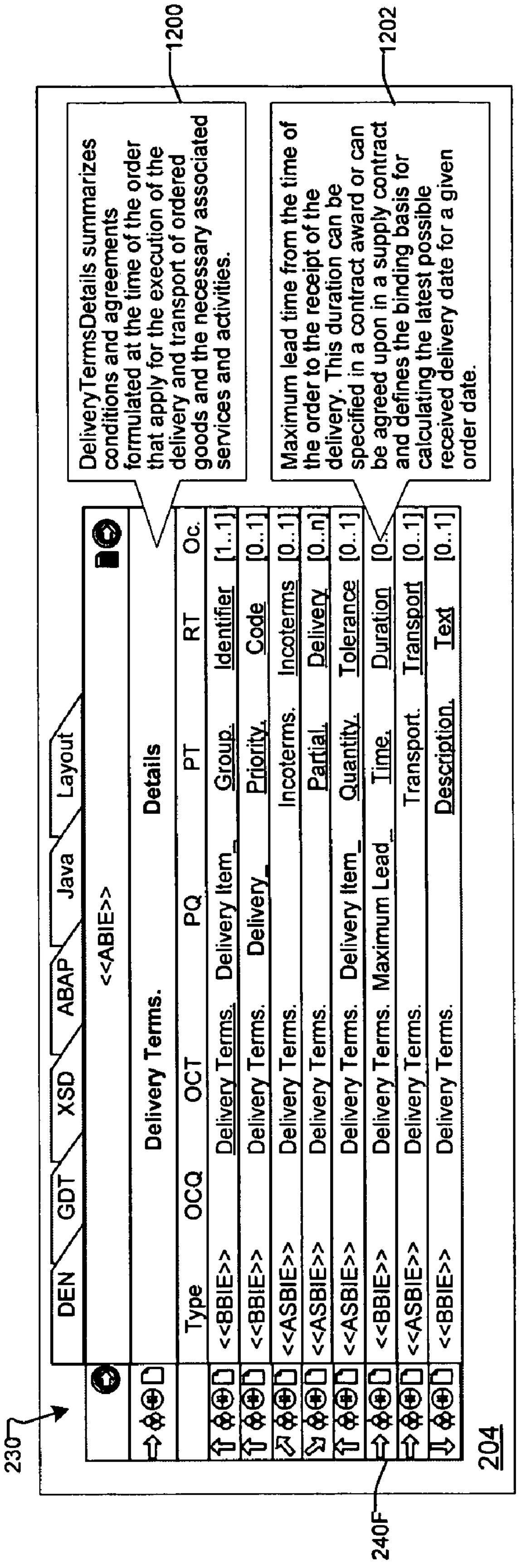
FIG. 12A-B show examples of the data component shown in FIG. 2 presenting textual descriptions.
Figure 12B:
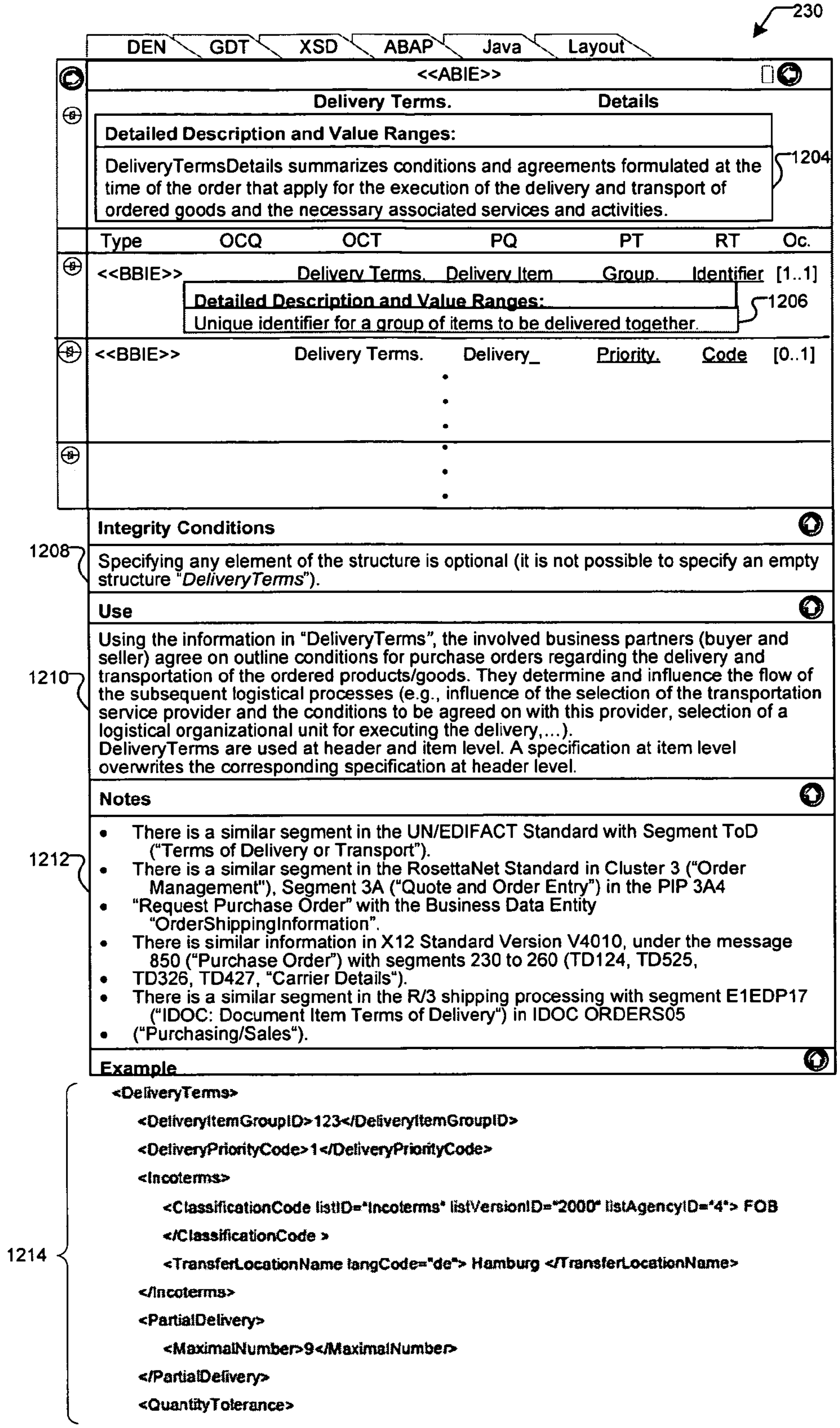

The modeling tool 108 may provide explanatory information that guides the user in performing the modeling. FIGS. 12A-B show explanatory information being provided for the delivery terms component 230 while presented in the area 204. First, in FIG. 12A, visual information containers 1200 and 1202 are being displayed. The container 1200 is associated with the entire delivery terms component 230 and summarizes its function and intended use. The container 1202 does the same for the BBIE entry 240F.

The information provided in the containers 1200 and 1202 may appear when an electronic pointer, such as that of a mouse, is placed of either of the respective areas. The information may have been generated by the user that created the component 230 and its parts and may be stored in the repository 126. For example, the containers 1200 and 1202 can be implemented using SMART TAG technology available in products from Microsoft Corp.

Second, in FIG. 12B, the explanatory information is presented in a different way. Here, an information area 1204 is added to the delivery terms component 230. Similarly, an information area 1206 is added to the BBIE entry 240A. Corresponding areas can be added for any of the components that make up the delivery terms component.

Other informational areas are also added. A conditions area 1208 informs the user of the integrity conditions for using the delivery terms component 230. The integrity condition may be based on object constrain language (OCL). A use area 1210 informs the user how the delivery terms component 230 is intended to be used. A notes area 1212 presents helpful notes. An example area 1214 shows an exemplary use of the delivery terms component implemented using markup code.

Figure 13A:
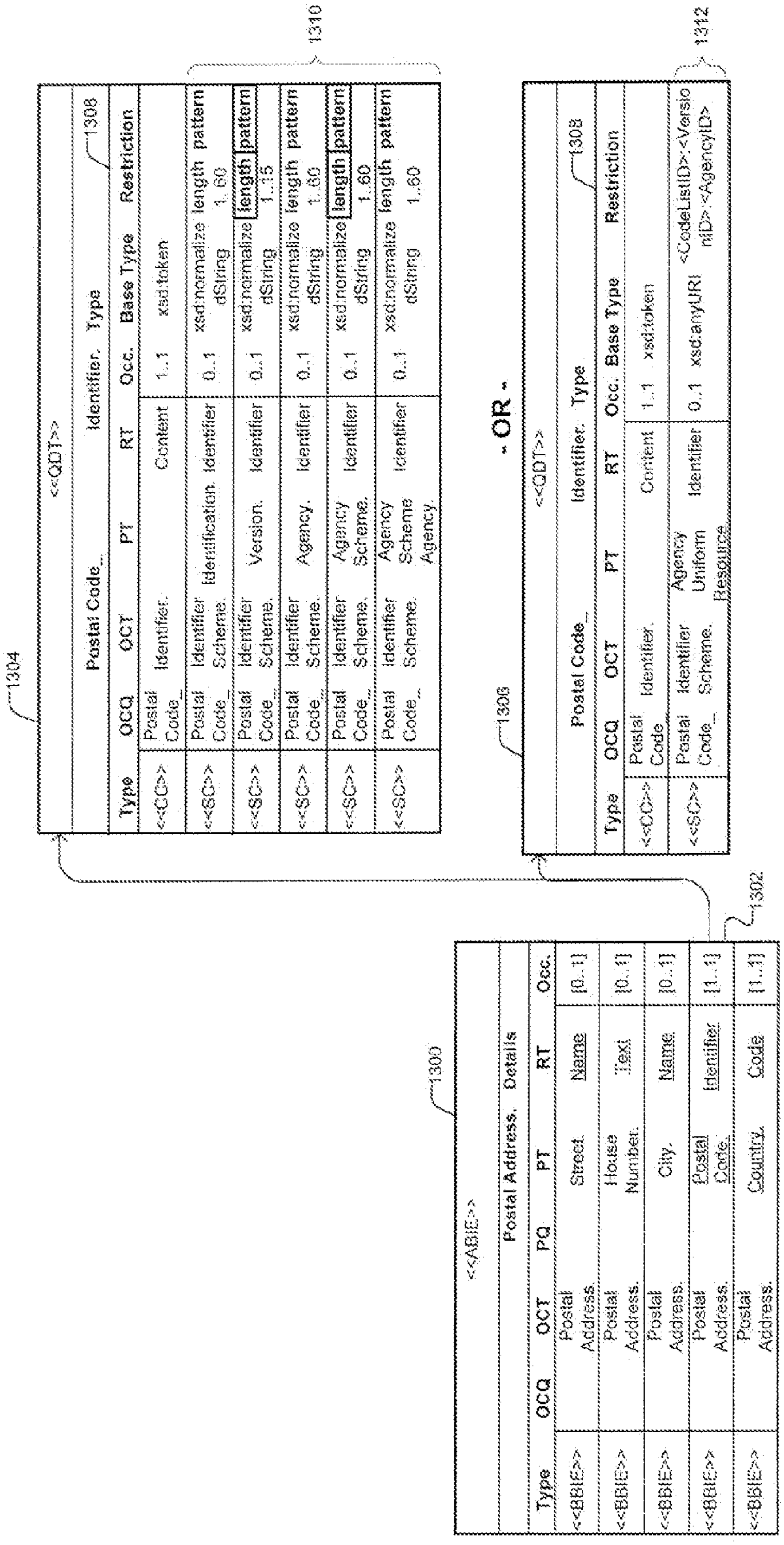

FIGS. 13A-B show examples of how qualified data types can be represented using additional attributes or a designated namespace. FIG. 13 A shows an ABIE 1300 that relates to the details of a postal address. The semantics of the ABIE 1300 is shown in a similar way as in other examples described above. The ABIE 1300 is made up of several BBIEs, and in particular a BBIE 1302 relating to an identifier for the postal code. The BBIE 1302 is based on a postal code identifier type Postal Code_Identifier. Type which is a qualified data type (QDT), meaning that it is a restricted data type, for example as described in FIG. 4 or 5.

The QDT can, however, be represented in two or more different ways: a first QDT representation 1304 and a second QDT representation 1306. Each of the representations 1304 and 1306 includes a restriction column in a semantic information area. The restriction column 1308 indicates the restriction(s) applying to the particular entry in the QDT. In the first QDT representation 1304, the restriction is represented using attributes 1310 and in the second QDT representation 1306 it is represented using an entry 1312 that relates to a designated namespace. For example, the entry 1312 identifies a certain version of a code list available from an agency. FIG. 13B shows a similar example for the ABIE 1300, now relating to a BBIE 1314 that is part thereof. Here, the QDT can have a first representation 1316 using attributes or a second representation 1318 using a namespace.

Figure 14A:
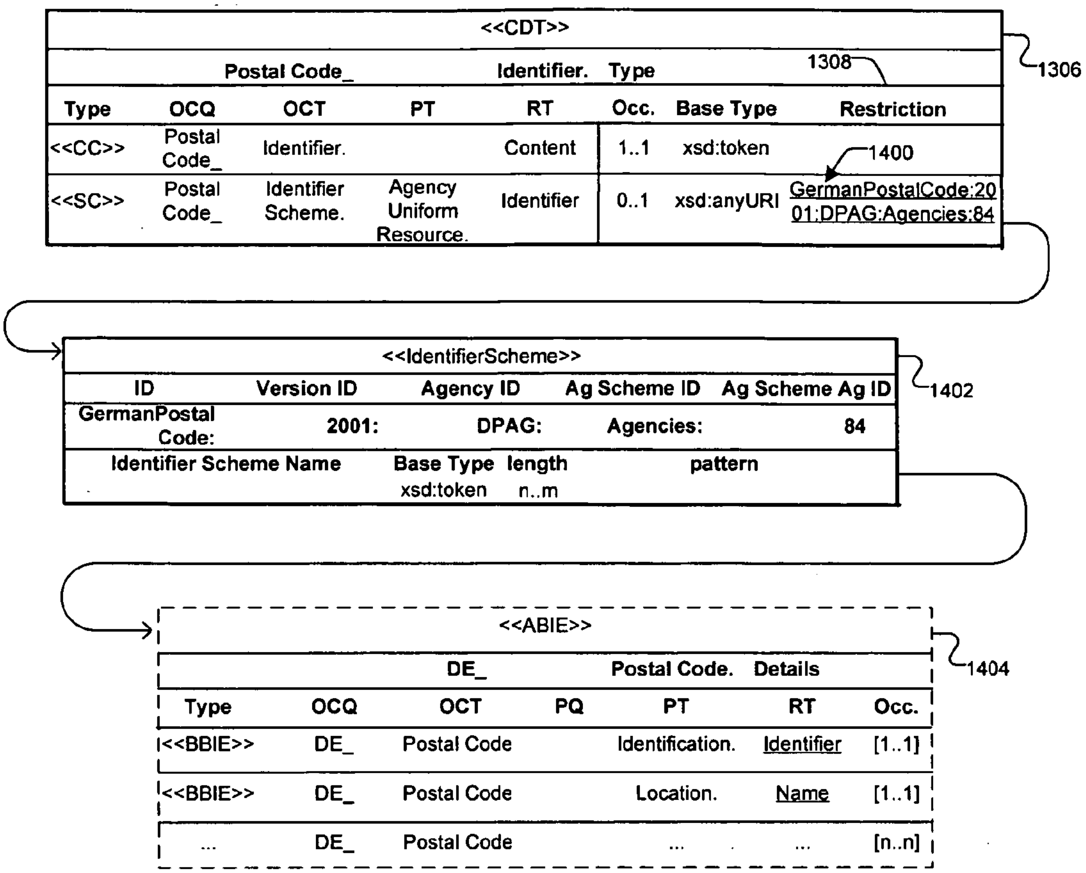
FIGS. 14A-B show examples of representing the core data types using designated namespaces.
Figure 14B:
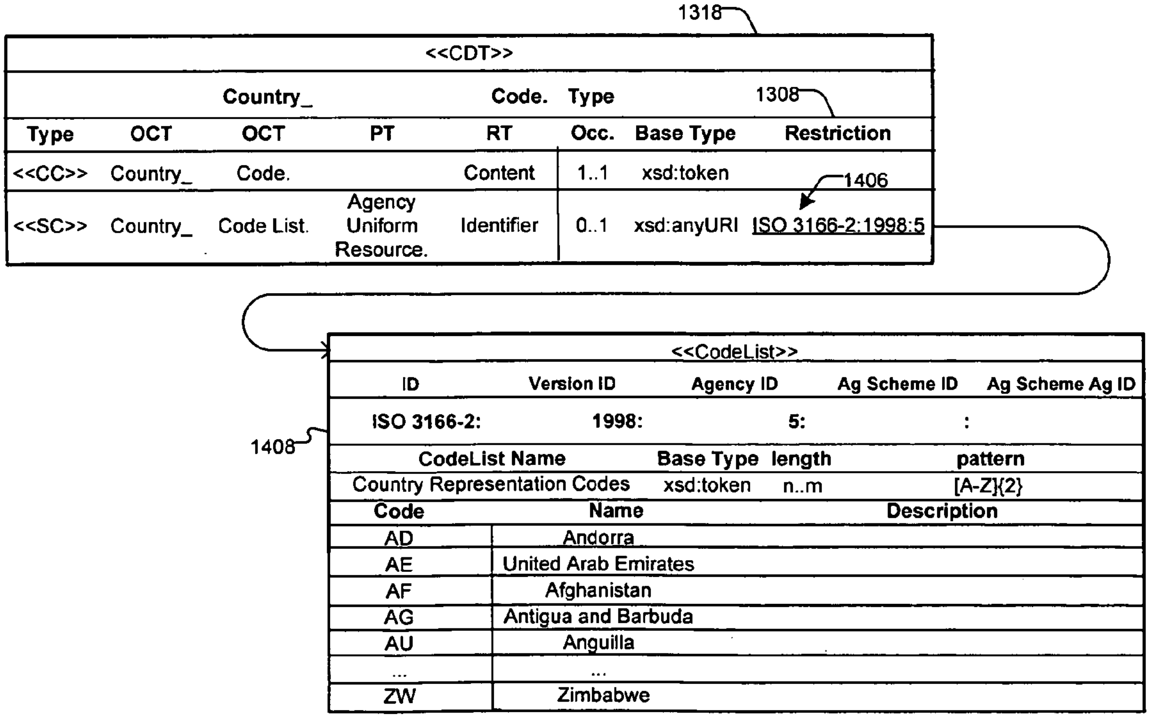

FIGS. 14A-B show examples of representing the core data types using designated namespaces. FIG. 14A shows a practical example using the second CDT representation 1306. Here, the restriction column 1308 includes an entry 1400 that reads:

GermanPostalCode:2001:DPAG:Agencies:84

The user can select the entry 1400 to have displayed in the GUI 200 an identifier scheme 1402 associated with the entry. That is, the user knows on which identifier scheme this specific identifier is based and can now get more detailed information about this identifier scheme, such as: who is responsible (agency), which version, what is the number range of this identifier, and what is the pattern (regular expression) of this identifier. The identifier scheme 1402 can be the basis for another ABIE 1404 that relates to details of German postal code.

FIG. 14B shows a practical example using the second QDT representation 1318. Here, the restriction column 1308 includes an entry 1406 that reads:

ISO 3166-2:1998:5, which is the namespace naming convention for representing the scheme id, version id, also described above with reference to FIG. 6. The user can select the entry 1406 to have displayed in the GUI 200 a code list 1408 associated with the entry. This may be the same as the code list detail area 606 described above with reference to FIG. 6. Some of the identifiers may be based on a fixed code list, and the user can here initiate the display of the values of this code list in a concise way. The code list 1408 lists the codes for a number of countries according to the ISO standard.

Figure 15:
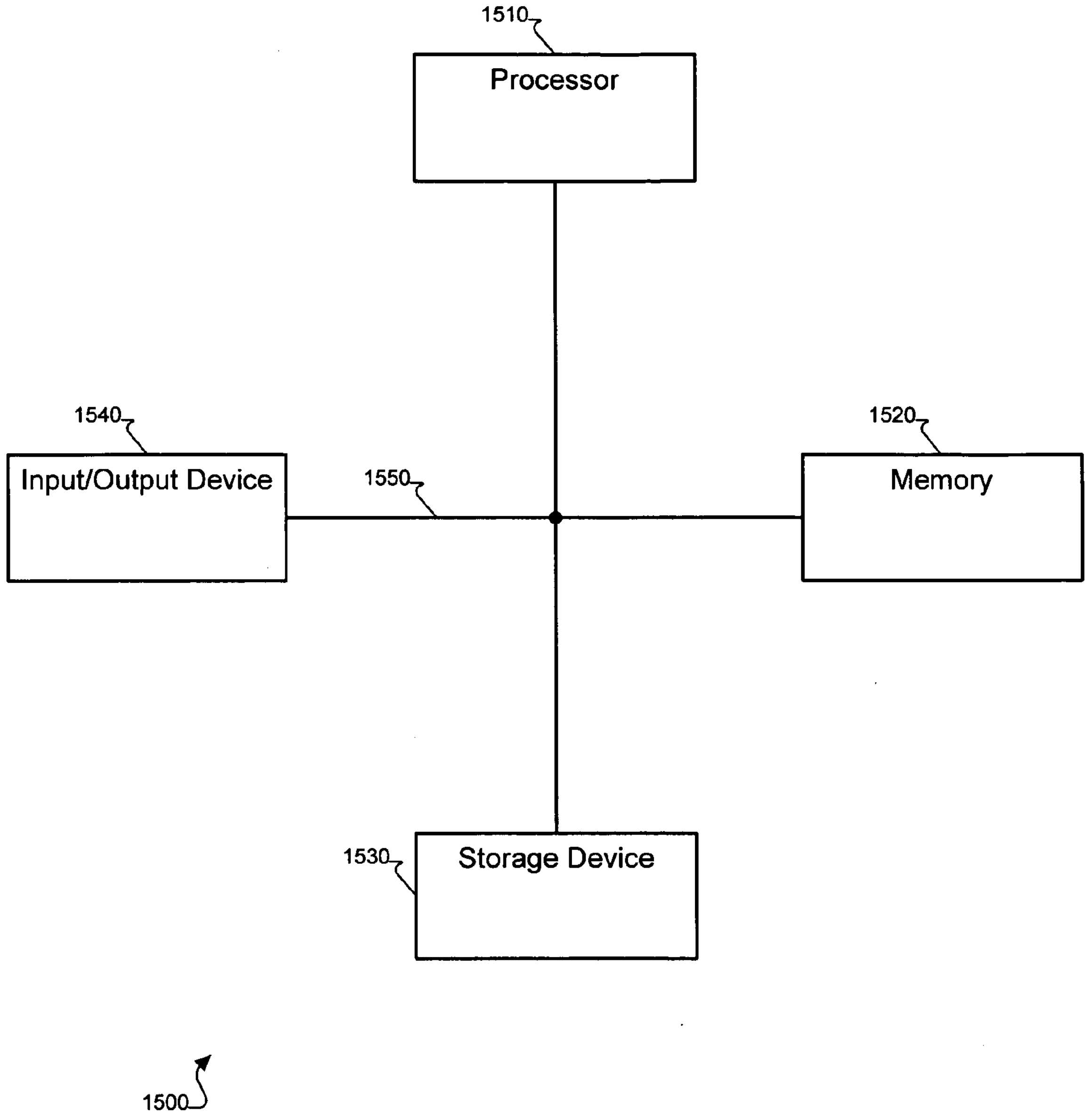
FIG. 15 is a block diagram of a computer system.

UPDATE FIG. 15 is a block diagram of a computer system 1500 that can be used in the operations described above, according to one embodiment. For example, the system 1500 may be included in either or all of the computer system 102, the user systems 106, and the administrator system 104.

The system 1500 includes a processor 1510, a memory 1520, a storage device 1530, and an input/output device 1540. Each of the components 1510, 1520, 1530, and 1540 are interconnected using a system bus 1550. The processor 1510 is capable of processing instructions for execution within the system 1500. In one embodiment, the processor 1510 is a single-threaded processor. In another embodiment, the processor 1510 is a multi-threaded processor. The processor 1510 is capable of processing instructions stored in the memory 1520 or on the storage device 1530 to display graphical information for a user interface on the input/output device 1540.

The memory 1520 stores information within the system 1500. In one embodiment, the memory 1520 is a computer-readable medium. In one embodiment, the memory 1520 is a volatile memory unit. In another embodiment, the memory 1520 is a non-volatile memory unit.

The storage device 1530 is capable of providing mass storage for the system 1500. In one embodiment, the storage device 1530 is a computer-readable medium. In various different embodiments, the storage device 1530 may be a floppy disk device, a hard disk device, an optical disk device, or a tape device.

The input/output device 1540 provides input/output operations for the system 1500. In one embodiment, the input/output device 1540 includes a keyboard and/or pointing device. In one embodiment, the input/output device 1540 includes a display unit for displaying graphical user interfaces.

The invention can be implemented in digital electronic circuitry, or in computer hardware, firmware, software, or in combinations of them.

Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer system comprising:

a repository having stored therein predefined data elements configured for use by a sender system in identifying information portions in electronic communications such that the information portions are automatically displayed and used by a receiver system to interpret contents of the electronic communications, each of the predefined data elements being associated with semantic information indicating its definition and intended use, the receiver system using the semantic information to display and interpret the electronic communications, wherein the data elements identify corresponding ones of the information portions according to the semantic information; and a modeling tool that, upon selection by a user, displays any of the predefined data elements for editing of the predefined data element and not of the information portions, the modeling tool presenting the semantic information for the selected data element, wherein an edited predefined data element is stored in the repository and accessed there by the receiver system.

2. The computer system of claim 1, wherein the modeling tool presents a user-selectable control for adding a new data element to the selected data element, and wherein the user-selectable control provides a choice between creating the new data element as a new aggregation data element and a new basic data element.

3. The computer system of claim 2, wherein the modeling tool provides that the user can select between predefined data types for the new data element.

4. The computer system of claim 3, wherein upon the user selecting one of the predefined data types, the modeling tool provides that the user can select between predefined properties associated with the selected predefined data type.

5. The computer system of claim 4, wherein the modeling tool determines at least one of the predefined properties that, together with the selected predefined data type, is of a qualified data type, and highlights the at least one of the predefined properties.

6. The computer system of claim 4, wherein upon the user selecting one of the predefined properties, the modeling tool provides that the user can select between predefined qualifiers associated with the selected predefined property.

7. The computer system of claim 6, wherein the modeling tool determines at least one of the predefined qualifiers that, together with the selected predefined property and the selected predefined data type, is of a qualified data type, and highlights the at least one of the predefined qualifiers.

8. The computer system of claim 1, wherein the modeling tool is configured to present more than one physical representation of the selected data element.

9. The computer system of claim 1, wherein the modeling tool provides that the user can modify, for any data element included in the selected data element, a value for any of several context categories that affect the relevance of the data element.

10. The computer system of claim 1, wherein the modeling tool is configured to present an item from at least one standard for electronic communication, the item being associated with a data element included in the selected data element through a mapping.

11. The computer system of claim 1, wherein the semantic information includes at least a data type, a property and a qualifier for the property.

12. The computer system of claim 1, wherein the modeling tool provides a choice control for indicating a possible choice between several data elements included in the selected data element.

13. The computer system of claim 1, wherein the modeling tool provides a sequence control for indicating a sequence including several data elements included in the selected data element.

14. The computer system of claim 1, wherein the modeling tool provides a choice control and a sequence control, and wherein the user nests one of the choice control and the sequence control within the other.

15. A method to be performed in a process of a user modeling a data element, the method comprising:

receiving a first user input made under guidance of a modeling tool in a graphical user interface (GUI), the input selecting one of several predefined data elements configured for use by a sender system in identifying information portions in electronic communications such that the information portions are automatically displayed and used by a receiver system to interpret contents of the electronic communications, each of the data elements being associated with semantic information indicating their definition and intended use, the receiver system using the semantic information to display and interpret the electronic communications, wherein the data elements identify corresponding ones of the information portions according to the semantic information;

presenting, in the GUI and in response to the first user input, a representation of the selected predefined data element, the representation containing the semantic information; and modifying at least one aspect of the semantic information of the predefined data element and not the information portions based on a second user input made under guidance of the modeling tool, wherein the predefined data element associated with the modified semantic information is stored in a repository and accessed there by the receiver system.

16. The method of claim 15, wherein the modification comprises adding another data element to a group of data elements that make up the selected data element.

17. A computer-program product tangibly embodied in a computer-readable medium, the computer-program product comprising instructions that, when executed by a processor, generate on a display device a graphical user interface (GUI) for modeling a data component, the GUI comprising:

a data element modeling area that presents a predefined data component selected by a user for editing, the predefined data element configured for use by a sender system in identifying an information portion in electronic communications such that the information portion is automatically displayed and used by a receiver system to interpret contents of the electronic communications, the editing performed on the predefined data element and not on the information portion, the data element modeling area presenting semantic information for the selected data element, the receiver system using the semantic information to display and interpret the electronic communications, wherein an edited predefined data element is stored in a repository and accessed there by the receiver system; and a data type modeling area that, upon the user's selection, presents a data type on which the selected data element is based.

18. The computer-program product of claim 17, wherein the data element modeling area further presents, upon selection by the user, at least one data element that is included in the selected data element.

19. The computer-program product of claim 17, wherein the data element modeling area visually indicates a modification that is made in the semantic information based on user input.

20. The computer-program product of claim 17, wherein the data type modeling area further presents data type semantic information editable by the user.

21. A method to be performed in a process of a user modeling a data element, the method comprising:

receiving a first user input made under guidance of a modeling tool in a graphical user interface (GUI), the input selecting one of multiple predefined data elements configured for use by a sender system in identifying information portions in electronic communications such that the information portions are automatically displayed and used by a receiver system to interpret contents of the electronic communications, each of the multiple predefined data elements being associated with semantic information indicating its definition and intended use, the receiver system using the semantic information to display and interpret the electronic communications, wherein the data elements identify corresponding ones of the information portions according to the semantic information;

presenting, in the GUI and in response to the first user input, a representation of the selected predefined data element for editing of the predefined data element and not of the information portions, wherein an edited predefined data element is stored in a repository and accessed there by the receiver system, the representation containing the semantic information, the modeling tool presenting the semantic information of the selected data element in table form, the presented semantic information comprising:

a name of the selected data element based on a Core Components Technical Specification and on an International Organization for Standardization 11179-5 convention, a data type of the selected data element, and any data element being included in the selected data element;

receiving a second user input made under guidance of the modeling tool to modify at least one aspect of the presented semantic information; and modifying the selected predefined data element according to the user input.

* * * * *